United States Patent [19]

Wise et al.

[11] Patent Number: 5,417,235

[45] Date of Patent: May 23, 1995

[54] INTEGRATED MICROVALVE STRUCTURES WITH MONOLITHIC MICROFLOW CONTROLLER

[75] Inventors: Kensall D. Wise; Janet K. Robertson, both of Ann Arbor, Mich.; Jin Ji, White Plains, N.Y.

[73] Assignee: Regents of the University of Michigan, Ann Arbor, Mich.

[21] Appl. No.: 98,738

[22] Filed: Jul. 28, 1993

[51] Int. Cl.[6] .............................................. F16K 31/02
[52] U.S. Cl. .................................. 137/1; 251/129.01; 251/129.06; 251/368
[58] Field of Search .............. 251/129.01, 368, 129.06, 251/129.17, 11, 331; 156/644; 137/1

[56] References Cited

U.S. PATENT DOCUMENTS

| | | |
|---|---|---|
| 4,815,472 | 3/1989 | Wise et al. |
| 5,082,242 | 1/1992 | Bonne et al. |
| 5,149,673 | 9/1992 | MacDonald et al. |
| 5,161,774 | 11/1992 | Engelsdorf et al. .......  251/129.01 X |
| 5,176,358 | 1/1993 | Bonne et al. ............... 251/30.05 |
| 5,180,623 | 1/1993 | Ohnstein ..................... 251/129.01 X |

OTHER PUBLICATIONS

R. L. Alley et al., "The Effect of Release-Etch Processing on Surface Microstructure Stiction," IEEE Sensor and Actuator Workshop, pp. 202-207, Hilton Head, S.C., Jun. 1992, IEEE Catalog #92TH0403.
S. T. Cho et al., "An Ultrasensitive Silicon Pressure-Based Flowmeter," *IEDM,*v 89, pp. 499-502 (1989) IEEE Catalog #89CH2637-7.
S. T. Cho et al., "CMOS Integrated Circuits and Silicon Micromachining," *Technical Report No. 203,* Solid State Electronics Laboratory, University of Michigan, Ann Arbor (Feb. 1992).
T. Ohnstein et al., "Micromachined Silicon Microvalve," Proc. IRE, Microeletromechanical Systems, MEMS Conference, pp. 95-98, Napa Valley, Calif. 1990, IEEE Catalog #90CH2832-4.
K. Kendall, "Adhesion and Surface Energy of Elastic Solids," *J. Phys. D.; Appl. Phys.,* v 4, pp. 1186-1195 (1971).
K. L. Johnson et al., "Surface Energy and the Contact of Elastic Solids," *Proc. R. Soc. London A.,* v 324, pp. 301-313 (1971).
C. H. Mastrangelo et al., "A Dry Release Method Based on Polymer Columns for Microstructure Fabrication," *Proc. IRE, Microelectromechanical Systems,* MEMS Conference, pp. 77-81, Fort Lauderdale, Fla. (1993)-IEEE Catalog #93CH3265-6.
C. H. Mastrangelo et al., "A Simple Experimental Technique for the Measurement of the Work Adhesion of Microstructures," IEEE Sensor and Actuator Workshop, pp. 208-212, Hilton Head, S.C. Jun. 1992, IEEE Catalog #920-7803-0456-X.

*Primary Examiner*—Gerald A. Michalsky
*Attorney, Agent, or Firm*—Harness, Dickey & Pierce

[57] ABSTRACT

Micromachined microvalves are held both open and closed electrostatically to maintain uniform gas microflow and improve closure characteristics. A microflow controller containing such a valve is combined with a predetermined restricted flow path. Multiple valve/restrictive flow path combinations are integrated on a binary flow path basis. Single and/or multiple valve actuation provides precise but variable flow control. Temperature and pressure sensors can be integrally included. Various valve and controller configurations, and methods of controlling them and forming them, are disclosed.

29 Claims, 7 Drawing Sheets

INTEGRATED MICROVALVE STRUCTURES WITH MONOLITHIC MICROFLOW CONTROLLER

BACKGROUND OF THE INVENTION

1. Field of the Invention

This invention relates generally to microvalve devices for controlling gas flow on a micro basis and, more particularly, to integrated semiconductor microvalve devices and microflow controllers that are fabricated using semiconductor materials and techniques and by semiconductor-type processing techniques.

2. Discussion of Related Art

Many applications exist in which it is necessary to accurately monitor and/or control very small changes in fluid pressure, especially the change in pressure of a very low pressure fluid stream. Monitoring such pressure changes permits one to measure flow velocity. With knowledge of the stream temperature and dimensions of the stream conduit or channel, one may even be able to use a pressure sensor as a mass flow meter. If a valve is placed in the path of the stream, and is made to be controlled by the pressure sensor, a fluid flow controller results. The use of miniature multi-part assemblies forming such a controller is well known in industry. Microflow meters are especially attractive in the medical and semiconductor process control areas, where gases are relatively clean and flow rates are often low, i.e., between about 0.1 and 10 standard cubic centimeter per minute. In the semiconductor industry, specific applications for these types of flow meters include low pressure semiconductor process control equipment such as ion implanters, chemical vapor deposition (CVD) reactors, sputtering equipment, and the like. Presently, these semiconductor industry applications represent an approximately $50,000,000 per year market for microflow meter applications. However, with increasing use of integrated circuits, and as such equipment becomes increasingly automated, the market is expected to grow significantly.

Currently, conventional microflow meters and microflow controllers do not generally perform satisfactorily below a flow rate of about one standard cubic centimeter per minute (SCCM). These prior art devices are generally constructed of intricate and/or small metal components which require precision assembly. Due to the intricacy of the various parts, and the delicateness with which they must be assembled, the cost of such assemblies is typically high. Further, the result and complex assembly of multiple parts may tend to be unreliable. Unreliability is at least in part due to the corrosiveness of materials used, human error in assembly, and the assembly's number of discrete parts. Still further, these prior art conventional microflow meters are gas velocity flow meters, based either on the measurement of a difference in pressure of a moving gas stream or on the measurement of a difference in temperature of a moving gas stream as the moving gas passes over a heated element. One disadvantage associated with determining difference in gas temperature, as compared to determining a difference in gas pressure, is that the time response of the differential gas temperature devices is slower than that of a differential pressure device. Additionally, it is objectionable and perhaps even unsafe to heat some gases.

Recent developments in thin film deposition and micro machining techniques now permit the reproducible formation of very thin silicon and dielectric integral diaphragms and other configurations, which can comprise extremely small capacitive type pressure sensors. U.S. Pat. No. 4,815,472, issued to Wise el al. and assigned to the assignee of this invention, discloses such a sensor and is herein incorporated by reference. Briefly, the Wise et al. pressure sensor comprises a micromachined single crystal silicon element, having a very thin integral diaphragm, affixed to a glass plate. The diaphragm and glass surfaces are spaced apart and include complementary electrodes that respectively form opposed plates of a capacitor. Change in pressure flexes the diaphragm, which changes the capacitance between the plates. The change in capacitance is thus a measure of pressure change.

The Wise et al. capacitor pressure sensor can be made using techniques quite similar to and compatible with the techniques typically used in integrated circuit wafer processing. Hence, such a pressure sensor can comprise a silicon substrate that also contains electronic components. The electronic components can be a temperature sensing resistor, diode, transistor and/or other signal conditioning electronics. The resulting integrated device, i.e., the pressure sensor (for a gas in an integral fluid flow channel) and the temperature sensor can provide a microflow meter that can measure pressures from 1 mTORR to over 100 TORR, having an associated flow resolution of $1 \times 10^{-8}$ SCCM and a range extending to $1 \times 10^{-3}$ SCCM. One such microflow meter, incorporating the capacitive pressure sensor disclosed in the above referenced patent, is disclosed in a paper co-authored by one of the present inventors. The paper is identified by the citation: S. T. Cho, K. Najafi, C. L. Lowman, and K. D. Wise, "An Ultra Sensitive Silicon Pressure-Based Flow Meter", *IEDM*, pp. 499–502 (December 1989). Such structures are made of materials that are inherently non-reactive with respect to many gases. Also, such structures are substantially monolithic. Hence they are inherently and/or statistically more reliable than the prior art flow control assemblies.

The sensitivity of the microflow meter described in the publications cited above is typically an order of magnitude higher than present commercially available microflow meters. The micromachined integrated microflow meter is significantly more sensitive than present commercially available microflow controllers. There is presently no commercially available way to reliably control the small gas flows which can be measured by micromachined semiconductor type pressure sensors. In order to control microflow of a gas, one must be able to incorporate a microvalve in the gas flow channel. One method proposed in the literature, is to close a small orifice using a cantilevered flap of a semiconductor material. In such proposed designs, an elongated cantilevered flap-like member is disposed adjacent a gas orifice, in position to close the orifice if the flap-like member is moved against the surface defining the orifice. It is proposed to move the member to that surface, and close the orifice, by electrostatic attraction. Thus, when the flap-like member is electro-statically attracted to the surface having the opening, the cantilevered member is (hopefully) moved into complete flush contact with the surface periphery defining the hole. In such a valve structure, the valve is normally open. It is closed by electrostatic action.

This invention recognizes some problems with respect to the prior proposed type of electrostatically actuated microvalve structure. The opening of the microvalve, if closed, and the maintenance of the microvalve in the open position require that the flap-like element have a spring-like quality and/or some inherent stiffness. In order to obtain a quick opening speed, and to ensure that the microvalve stays completely open when not actuated into the closed position, one must make the flap-like element quite stiff. This increases the voltage needed to close it, and reduces the likelihood of obtaining a good seal around the hole, unless the flap-like element has an extended length. On the other hand, if it has extended length, it may not have sufficient rigidity to open quickly and/or stay open. No mechanism has been suggested to solve such problems or to control the oscillations of the cantilevered member when the electrostatic force is released. In other words, the cantilevered member could flap up and down at its natural frequency, thus interfering with gas flow through the associated orifice. Also, the natural spring response of cantilever structures is susceptible to oscillation induced by mechanical movement of the structure. Such problems represent, in our view, significant obstacles to rendering such micromachined, electrostatically driven microvalve structures commercially useful. If a useful and highly sensitive microvalve structure cannot be made, a useful and highly sensitive microflow controller cannot be made.

A micromachined microvalve is described in the publication Ohnstein, et al., "Micromachined Silicon Microvalve", *IEEE*, pp. 95–98 (April, 1990). The silicon microvalve disclosed in that paper is an electrostatically actuated microvalve which is intended to modulate a gas flow. This microvalve is integrally fabricated on a single silicon wafer using surface and bulk micromachining. The electrostatic actuation of this silicon microvalve is limited to causing a closure plate to electrostatically seal an inlet orifice. In other words, electrostatic action operates to pull the closure plate over the inlet orifice. This proposed structure suffers from the problems referred to above. Therefore, the problems with controlling microflow remain, thus impeding commercial development, including more widespread use, of microflow meters.

Therefore, a primary objective of the present invention is to provide an improved microvalve structure capable of precisely controlling very small fluid flow and overcoming the limitations associated with earlier proposed designs. A principal object of the present invention is to provide a microvalve which utilizes a cantilevered member electrostatically positioned to close a fluid flow orifice as well as to open it.

Yet another object of the present invention is to provide a semiconductor microvalve structure which can be fabricated in multiples, using micromachining techniques, in order to provide a microvalve controller fabricated at a significant cost reduction over its conventional counterpart, and yet have a greater sensitivity and reliability.

Other major objectives include providing several improved integrated silicon semiconductor microvalve structures capable of being mass produced using familiar silicon semiconductor processing techniques to simultaneously construct numerous devices on a silicon wafer.

SUMMARY OF THE INVENTION

This invention involves an integrated semiconductor microvalve incorporating a reversibly electrostatically biased cantilevered beam for selectively positively covering a gas orifice and for selectively positively uncovering the gas orifice. This invention also involves cantilevered beam structure having a thickened portion for contact with an orifice, which thickened portion, i.e., a "boss", for improved orifice seating. In a first embodiment, a conductive cantilevered beam is suspended from the ceiling of, but electrically isolated from, a hollow housing of electrically conductive semiconductor material interiorly shaped to wholly accommodate the cantilevered beam. The housing has a generally planar edge surrounding the hollow, which edge is electrostatically bonded to a glass substrate, effective to form a substantially closed chamber therewith. An orifice in one of the housing or the substrate permits gas to flow into or out of the chamber. A second opening is analogously provided to the chamber as well. The second opening is generally not controlled within the chamber. An electrode is provided on the substrate opposite from the orifice. The suspended portion of the cantilevered beam is disposed below the orifice and above the electrode. A dielectric layer is disposed on the surface of the suspended beam portion and inside the chamber on the housing surface surrounding the orifice. Applying a first voltage between the housing and the beam electrostatically pulls the beam to the orifice, closing the valve. Terminating the first voltage, and applying a second voltage between the beam and the electrode under the beam snaps the valve open. Continuing to apply that second voltage after the valve is open, ensures the valve stays open in a predetermined manner.

In a second preferred embodiment, the housing is essentially the same as in the first environment, and similarly bonded to a major surface of the glass plate to form a generally closed chamber. However, in the second embodiment, the cantilevered beam is electrostatically bonded to the glass substrate. It is not supported by the inner surface of the semiconductor housing. As with the first embodiment above, the cantilevered beam is electrically conductive, and corresponding housing and facing electrodes are respectively provided on the housing and substrate in order to electrostatically cause the cantilevered beam to either close the gas inlet orifice and the semiconductor shell or snap the gas inlet orifice open, and hold it open. This embodiment and others that follow include the "boss", or thickened central portion for improved contact with the orifice. In embodiments that follow, the thickened portion or "boss" is flat on its contact surface with the flat orifice periphery. Such valves can be combined with a semiconductor pressure transducer and a temperature sensor to form a semiconductor microflow controller. More will be said about a semiconductor microflow controller in the discussion that follows in this specification.

The microvalves as just discussed are fabricated by well known semiconductor techniques of the type familiar to the integrated circuit industry, and used to make microaccelerometers and micro pressure transistors. Such techniques make it possible to fabricate many of these valves simultaneously on a single substrate. Consequently, according to a third embodiment of this invention, there is provided the microflow controller incorporating a plurality of these types of valves on a common substrate. It can be considered to be an integration of a multiplicity of valves. It is monolithic in that a single glass plate serves as a support for a plurality of valves and pressure sensors. Providing a plurality of microvalves on a single substrate permits one to concurrently use more than one valve to minutely control gas flow. One can monitor the gas flow by means of a pressure sensor integrated within the flow controller. In a preferred embodiment of this microcontroller, the microvalves are connected to varying widths and/or lengths of flow channels. Methods of operating valves and such a controller are also described.

Additional objects, advantages and features of the present invention will become more apparent from the following description and appended claims, taken in conjunction with the accompanying drawings.

DETAILED DESCRIPTION OF THE PREFERRED EMBODIMENTS

The following discussion of the preferred embodiments concerning semiconductor microvalves and microflow controllers is merely exemplary in nature and is in no way intended to limit the invention or its applications or uses.

Figure 1A:
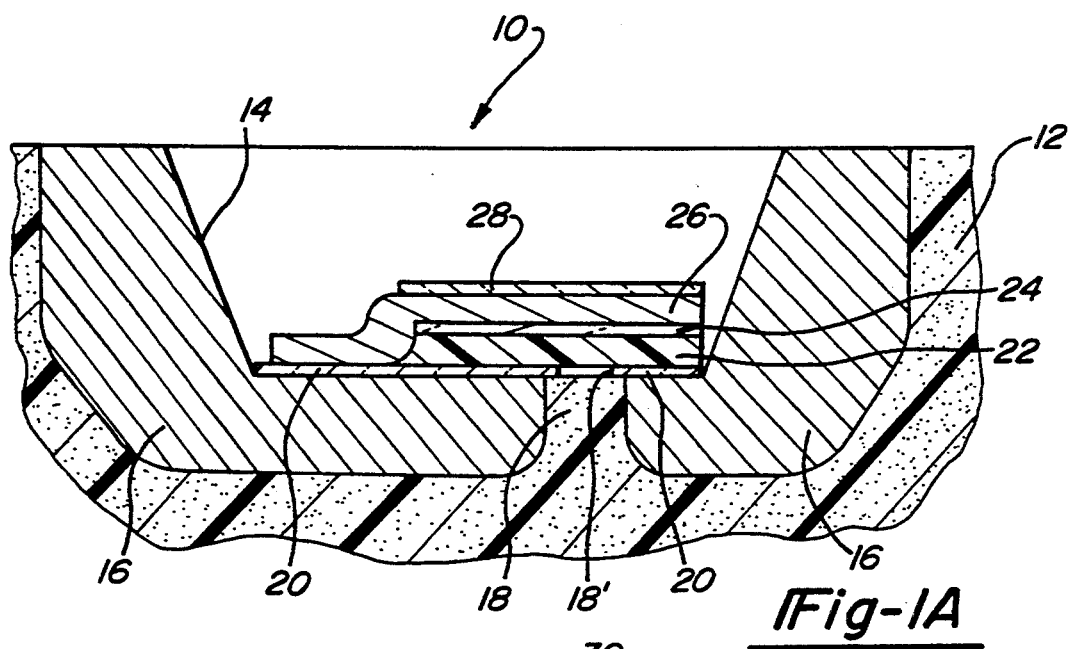
FIGS. 1A–1B are sectional views showing successive processing steps of the semiconductor microvalve structure according to one preferred embodiment of the invention.

First, turning to FIG. 1A, a semiconductor microvalve structure is shown in an intermediate processing step. In order to generate the structure 10 as shown, a flat semiconductor substrate or "wafer" 12, generally of monocrystalline silicon having moderate to high resistivity and having a thickness of about 15 mils, is first provided. Resistivity of the silicon should be moderate to high, to insure that there will subsequently be an etching differential caused by the diffusion process described in the following paragraph. This means the silicon wafer is undoped or only lightly doped, as for example a resistivity of about 2–10 ohm-centimeter.

Figures 9A, 9B:
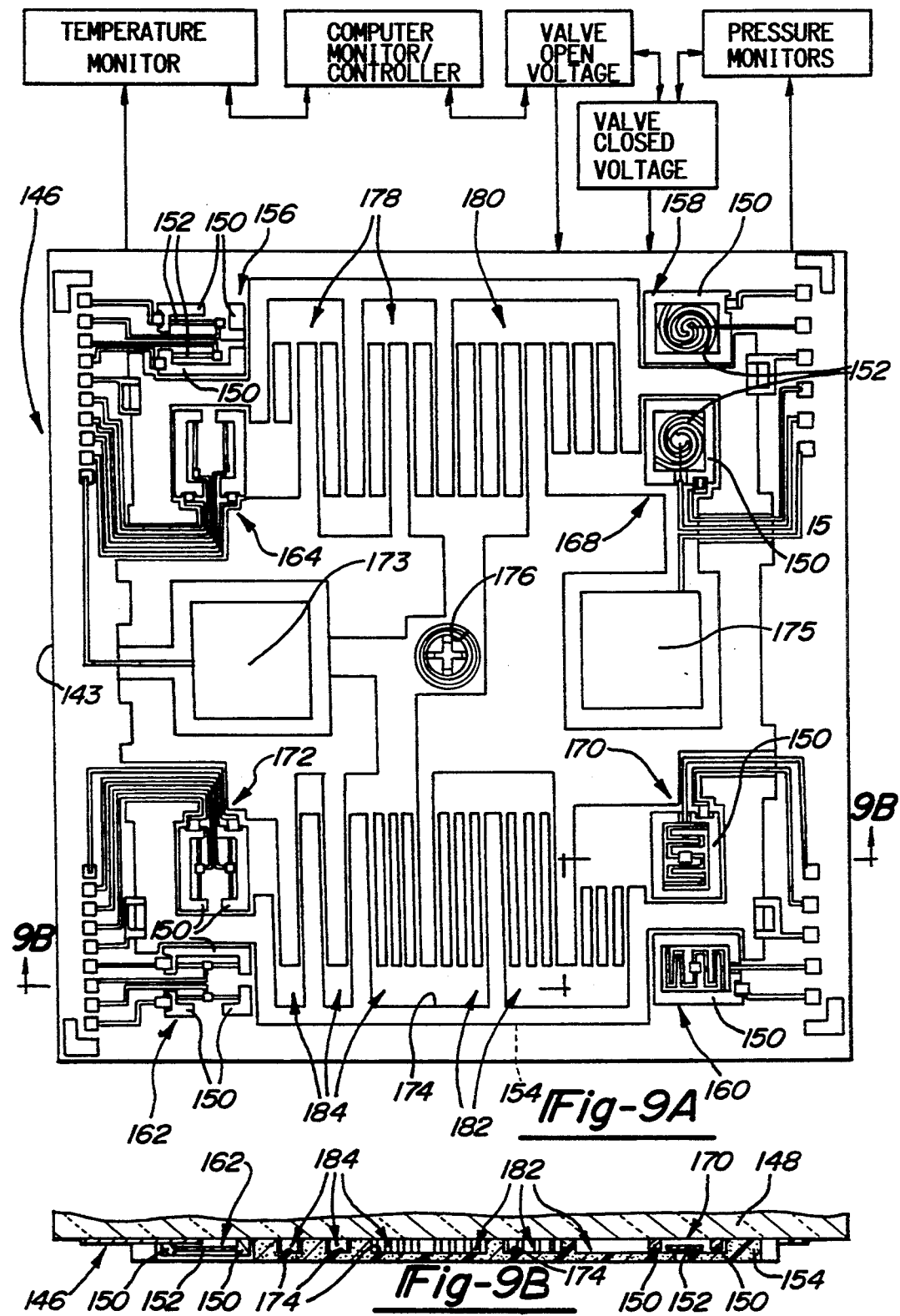
FIG. 9A shows a sectional view along the line 9A—9A of FIG. 9B, showing a semiconductor multiple microvalve body incorporating four active microvalves and four test microvalves, with the four active microvalves connected to distinctive gas flow channels.
FIG. 9B shows a sectional view along the line 9B—9B of FIG. 9A.

Before the diffusion process is performed, a generally rectangular recess 14 is produced in the substrate 12 by etching in aqueous potassium hydroxide (KOH) or by reactive ion etching (RIE). As is well understood in the art, an aqueous KOH etch is an anisotropic wet etchant. RIE is a dry etching technique. Both use a photolithographically defined etching mask. This etching step may also be used to concurrently fabricate microflow channels in a microflow controller body in which the microvalve structure 10 is disposed. A complex form of a microflowcontroller body is shown in FIGS. 9A and 9B. It should be noted that the microflow channels can alternatively be initially etched in the glass plate 40 to which substrate 12 is later attached. Also, if increased flow is desired, mating channel portions can be etched in both the substrate 12 and the glass plate 40. In the latter instance, of course, the mating channel portions must be registered before bonding substrate 12 to glass plate 40.

Typically the depth of the recess 14 will be about 4 micrometers and the length of the recess 14 will be about 400 micrometers. The width of the recess 14 is about two thirds to three quarters of its length. However, precise configurations as to length and width are usually a matter of design choice, and may be a factor of how much space is needed to provide a beam length, width and/or thickness that is desired. It is to be remembered that the longer and thinner a beam is, the less energy it takes to close it but the less durable it might be. It should also be recognized that if any of the previously mentioned microflow channels were etched into the upper face of substrate 12 or glass plate 40, they would intersect recess 14, as is shown in the microflow controller of FIGS. 9A and 9B.

Following the etching of the recess 14, and of any associated microflow channels or portions thereof in substrate 12, a selective boron diffusion process is performed in order to define a P++ region 16 in the silicon substrate 12. This P++ region 16 will be retained as the valve housing following a final etch step of the silicon substrate 12, as will be discussed in greater detail below. The boron diffusion process will selectively dope the sidewalls and floor of recess 14 with about $1 \times 10^{19}$ dopant atoms per cubic centimeter to a thickness of about 12 micrometers, to form P++ region 16. A region 18 generally centrally disposed on the floor of recess 14 is isolated during the boron doping process by a silicon oxide mask, in order to provide an undoped portion of substrate 12 that will eventually form a gas inlet hole through the region 16, as will be hereinafter further described.

A blanket dielectric layer 20, such as of silicon nitride, is next deposited within the recess 14 by a suitable deposition process, such as low pressure chemical vapor deposition (LPCVD), to a thickness of about 1000 angstroms. The blanket dielectric layer 20 is photolithographically defined to remove it from the recess sidewalls and open a window in the remaining recess floor portion of layer 20, over region 18, to define a gas inlet orifice 18'. A blanket undoped polysilicon layer 22, or layer of other suitable sacrificial material, and another blanket layer 24 of a dielectric are next successively deposited over the photolithographically defined dielectric layer 20 and the exposed region 18 by appropriate deposition processes, such as LPCVD. These blanket layers are then patterned by a suitable process such as a wet chemical etch or an RIE process, to remove all portions but those on most of the floor of recess 14 surrounding orifice 18'. However, it leaves a portion of layer 20 exposed to act as a beam support area in the resultant product.

A second blanket polysilicon layer 26 is then deposited by an applicable deposition process over the previously configured polysilicon layer 22 and the dielectric layer 24. Any convenient polysilicon deposition process can be used. The second polysilicon layer 26 is doped P++ as originally deposited, or by subsequent heavy diffusion of boron. This prevents layer 26 from being significantly etched by an etchant that will attack undoped polysilicon layer 22. The polysilicon layer 26 is then photolithographically defined on the floor of recess 14 as either a cantilevered beam having a suspended middle and free end or a double-ended clamped beam having supported ends and a suspended middle. By double-ended clamped beam we mean a beam supported rigidly at both of its opposite ends, analogous to a bridge supported by abutments at opposite ends of the bridge. However, the major portion of its length is its unsupported middle portion, the portion between the supported ends. In this example, the beam is shown as a cantilevered beam having a suspended portion that includes a free or unsupported end. RIE can be used for etching to define the beam. As seen in FIG. 1A, the left end of the beam layer 26 is affixed directly to dielectric layer 20, which eventually provides an anchor or support for beam layer 26. It can be seen that this area of layer 20 was previously exposed when layers 22 and 24 where defined. Typical dimensions of the beam layer 26 are 1 micrometer thick, 100 micrometers wide and 400 micrometers long. About two-thirds to three-quarters of beam layer 26 overlaps layers 22 and 24.

Next, another blanket dielectric layer 28 is deposited, and then patterned for reasons which will become more apparent below. Layer 28 is patterned to remove it from all portions of layer 26 except those portions over the remaining portions of layers 22 and 24. This provides an insulating dielectric coating on the upper surface of the portion of beam layer 26 that will become suspended as a result of further processing.

It should be noted that all of the figures in the drawing are not drawn to scale, to more clearly illustrate the important aspects of this invention. Thin layers are exaggerated and especially deep or thick sections have been shown in reduced thickness for purposes of illustration.

Figure 1B:
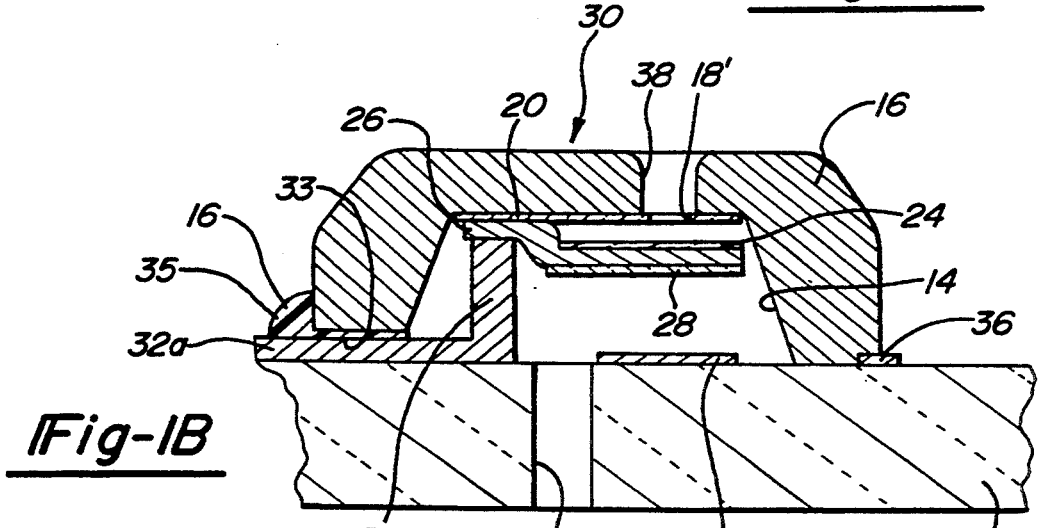

Once the above described layers have been formed in recess 14 and configured as discussed, the flat surface of microvalve structure 10 surrounding recess 14 is electrostatically bonded to a surface of a glass substrate that is flat at least in the area contacting silicon substrate 12. Preferably, it is a glass plate having a coefficient of thermal expansion matching that of silicon. It should be recognized that other methods of bonding may prove to be satisfactory, including the use of fused glass interlayer. The result is an almost-completed structure 30, the completed form of which is shown in FIG. 1B. The drawings show the silicon wafer flipped over, and positioned recess-face down on the glass substrate 40. One may prefer to perform the bonding with the recess-face up and the glass substrate 40 on top. The valve structure will comprise a housing opening 38, an orifice 18' and an orifice closure member, i.e., cantilevered beam layer, 26.

Prior to the structure 10 being electrostatically bonded to the glass substrate 40, the glass substrate 40 is metalized with a suitable metal, and patterned by any normal and accepted patterning process to form metal circuit pattern that includes electrodes, interconnects and contact regions at desirable locations. Appropriate metallization processes and patternings are well known to those skilled in the art. We prefer to use three layer metallization coating. It includes a (100 angstrom thick) titanium button layer, a 100 angstrom thick platinum intermediate layer and a 2500 angstrom thick gold top layer. However, all three layers of the coating are not used in all parts of the pattern. The gold layer is too thick to allow it to be used between the substrate 12 and glass plate 40 in facing areas that are electrostatically bonded, as for example where electrodes 36, 62 and 64 are located. The high thickness of the gold layer is needed for soldering, wire bonding, and the like on the surface of glass plate 40 outside of the valve or microcontroller chamber, e.g., recess 14 in FIG. 1B or recess 51 in FIG. 2. Accordingly, where contact 36 is made in FIG. 1B, or contacts 62 and 64 are made in FIG. 2, the top layer of gold is omitted. In substance a wide variety of metals can be used in the metallization pattern. However, the metal thickness should not be appreciably thicker than 200 angstroms if it is disposed between electrostatically bonded facing surfaces. Otherwise the facing surface will not seal around the edges of the metallization layer. Such a technique is satisfactory if a low resistance electrical connection is to be made, for example, between the metallization pattern and housing 16 in FIG. 1B or housing 52 in FIG. 2.

For portions of the metallization pattern that are electrically isolated from the housing, they can be of any convenient thickness and follow the path of a flow channel out of the valve chamber, or out a channel etched in the bonded face of the housing solely to form a path for the metallization. Such an auxiliary channel is shown in FIG. 1B and indicated by reference numeral 33. An extension 32a of contact 32 passes through it out of recess 14. In this area of the metallization pattern, extension 32a would include the 2500 angstrom gold layer over the 100 angstrom, such as platinum and titanium layers. Channel 33 has a depth, or height in FIG. 1B, that is at least 4,000–5,000 angstroms, and is comfortably wider than the width of extension 33, to insure electrical separation. If not sealed, the channel 33 would form a leak path from recess 14. Accordingly, channel 33 is externally sealed with a drop 35 of silicon adhesive. While the foregoing exit technique works, it is preferred to have the metallization pattern exit recesses 14 and 51 via existing gas flow channels if possible, and only via a separate exit channel where necessary. This enhances durability of the resultant product.

In this embodiment, an electrode 32 is patterned in order to register with the exposed surface portion of beam layer 26 opposite from where it contacts dielectric layer 20. The electrode contact 32 is built up by a suitable process to a height that corresponds to the depth of recess 14 minus the thickness of layers 20 and 26, which here is about 3 micrometers. Thus, it will contact the exposed surface of the beam layer 26 opposite from where that portion of beam layer 26 contacts layer 20. A slight excess of metal height for contact 32 will insure positive and effective electrical contact between contact 32 and layer 26. The structure can accommodate a slight excess because metal will tend to be somewhat malleable, and the electrostatic bonding forces are strong enough to pull silicon substrate 12 and glass substrate 40 together and abut contact 22 against beam layer 26.

Further, an electrode 34 is provided on glass plate 40 for disposition under the suspended portion of beam layer 26. It is present to provide an electrostatic attraction means to the cantilevered beam layer 26 (which as yet in this discussion is still in its non-cantilevered state). As previously indicated electrode 34 will have an extension (not shown) that leads outside of recess 14, which extension facilitates making low electrical resistance contact to electrode 34. Additionally, an electrode contact 36 is patterned on the glass substrate 40 in order to apply a voltage to the P++ housing region 16. Electrode 36 will also have an extension (not shown) that facilitates making low electrical resistance contact to electrode 36.

The silicon wafer 10 is bonded to the glass plate using an electrostatic (anodic) bonding technique. The alignment of the silicon wafer to the glass substrate is straightforward since the glass is transparent. The bonding is preferably formed by heating the assembly of the wafer and glass substrate to about 400°–450° C. and then applying 400–600 volts DC from a suitable power source across the glass plate and the silicon wafer for two minutes. This forms a hermetic seal between the rim structure (e.g. rim portions of body 10) of the wafer and the glass even over metallization layers up to about 200 angstroms thick. The electrostatic bonding of a silicon wafer to glass is widely used to construct other types of silicon capacitive pressure transistors, for example, see Y. S. Lee and K. D. Wise, "A Batch-Fabricated Silicon Capacitive Pressure Transducer With Low Pressure Sensitivity", IEEE Transactions On Electron Devices, V ED-29, n1 pp. 42–48 (January, 1982), which is hereby incorporated by reference. Thus, the electrostatic bonding step need not be further described here.

Once the structure 10 is electrostatically bonded to the glass substrate 40, recess 14 is effectively sealed. The entire structure is then placed in a selective etchant for undoped silicon, such as ethylene diamine pyrocatechol (EDP), in order to dissolve away the undoped portions of the silicon structure 10 including the undoped region 18. This forms a substantially continuous, except for region 18, hermetically sealed housing member out of the diffused region 16. Once region 18 is etched away, the interior of recess 14 is exposed, and the etchant can also dissolve away the first polysilicon, i.e., sacrificial, layer 22 within recess 14. The dissolution of region 18 will define a gas inlet opening to recess 14. In this manner, the doped polysilicon layer 22 under undoped polysilicon layer 26 will dissolve away, and layer 26 becomes cantilevered beam 26. In a sense, during this etching, the end of cantilevered beam 26 intended to be suspended is released. Since the silicon etchant does not significantly attack boron-doped areas, the P++ region 16 remains substantially unaffected. Silicon dioxide, silicon nitride, and noble metals are also not attacked. Consequently, the microvalve 30 is formed as shown in FIG. 1B.

In operation, gas will flow down through the inlet opening 38, through the orifice 18' and into recess 14, and then out of recess 14 through a hole 39 in the glass substrate 40. It should be understood that the outlet hole 39 could alternatively be in the silicon body 16, or at the interface between the silicon body 16 and the glass plate, as would be the case if recess 14 connects to microflow channels formed in the base of substrate 12 when recess 14 was formed. Such channels can provide an extended length flow control channel in a microflow controller, as previously indicated. By applying the appropriate potentials to the electrode contacts 32, 34 and 36, it is possible to either electrostatically hold the inlet orifice 18' open, or electrostatically position the cantilever beam 26 against the dielectric 20 in order to close the inlet orifice 18'. Specifically, by applying opposite potentials to the electrode 32 and the electrode 36, the cantilevered beam 26 and the P++ region 16 will be oppositely charged attracted to each other, and thereby close orifice 18'. A direct current potential of about 5–10 volts is generally useful. The dielectric layer 20 prevents electrical contact of the beam 26 from the region 16, thus avoiding a short circuit.

Most importantly, in order to hold the inlet orifice 18' open, electrodes 32 and 34 are oppositely charged, causing cantilevered beam 26 to be attracted to electrode 34. This opens the orifice 18' quickly, and so long as the voltage applied to these electrodes is maintained, the orifice 18' will stay completely open. A dielectric layer 28 inhibits the cantilevered beam 26 from shorting to the pull down electrode 34.

Figure 2:
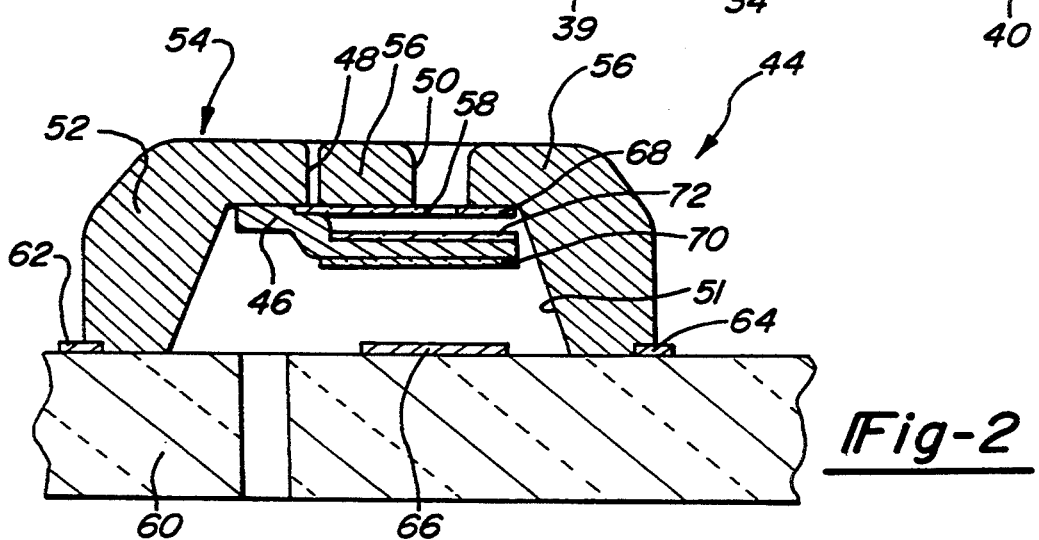
FIG. 2 is a sectional view showing a semiconductor microvalve structure according to a second preferred embodiment of the present invention.

Now turning to FIG. 2, an integrated microvalve 44 is shown according to a second preferred embodiment of the present invention. It is similar to that of the first embodiment discussed above. However, it differs in that the cantilevered beam layer 46 is electrostatically charged directly from a section 52 of the P++ silicon region 54. For this reason, when glass plate 60 in FIG. 2 is metalized and patterned, an electrode, like electrode 32 in FIG. 1b, is not provided. Consequently, the intricate step of building up electrode 32 to the proper height is not required. In this embodiment of the invention, a portion 52 of the P++ silicon body 54 is used to not only support but make low resistance electrical contact with the cantilevered beam 46. An additional electrode 62 is provided on the glass plate to make electrical contact with portion 52 of P++ body portion 54. Electrodes 62 and 64 are not two portions of a single annular electrode. They are two separate electrodes.

During the boron diffusion process which forms the P++ region 54, the region 54 is patterned. It is patterned so that during the silicon etching step, a slot 48 is formed in the region 54, which slot separates P++ silicon body 54 into separate part 52 and part 56. In other words, when the boron diffusion process is performed, the region 54 is patterned to not only prevent doping of gas inlet region 50, but to also prevent doping of a separate region that will form a slot 48. The remaining steps are substantially identical to those of FIGS. 1A–1B. However, in this example, dielectric layer 68 has to initially be left on the sidewall portions of recess 51 associated with slot 48. If not, slot 48 will have to be filled or covered with a dielectric. If slot 48 is going to be used as an outlet port, a selective attachment must be made to body part 56 by a source of a gas stream to be controlled. It may be desirable to cover or fill the slot 48 in any event, to insure integrity of a seal for recess 51, if slot 48 is not used as an outlet port to recess 51. A room temperature vulcanizable rubber (RTV) type of material might be useful to fill and/or cover slot 48.

By this slot isolation technique, the cantilevered beam 46 can be electrostatically driven by the electrode 62 on glass plate 40, which is in low resistance electrical communication with body section 52. As above, the gas inlet opening 50 enables gas flow into the microvalve 44 and electrode 64, analogous to how electrode 36 provides electrical charge to section 56 in FIG. 2. When a D.C. voltage is applied between electrode 62 and 64, opposite electrical charges are formed on body section 56 and the cantilevered beam 46. This causes the beam to be attached to body section 56, closing the gas inlet orifice 58. The dielectric layer 68 electrically isolates the cantilevered beam 46 from the body section 56 when the valve is closed. When a D.C. voltage is applied across electrode 62 and electrode 66, and the voltage across electrode 62 and 64 is removed, the cantilevered beam 48 is no longer held against layer 68 and quickly is attracted towards electrode 66. This quickly opens the gas inlet orifice 58. Maintaining the voltage radiant between electrodes 62 and 66, maintains opposite electrical charges on electrode 66 and cantilevered beam 46, holding the gas inlet orifice 58 completely open. Dielectric layer 70 on the cantilevered beam 46 prevents direct contact, and an electrical short circuit between, cantilevered beam 46 and electrode 66. An additional layer of dielectric material may be desired on electrode 66 to provide a double layer of dielectric at the interface between the beam 46 and electrode 66, analogous to the two dielectric layers 72 and 68 between cantilevered beam 46 and body section 56. In this example, layer 72 is only an artifact resulting from the process by which cantilevered beam 46 was made.

Figure 3A:
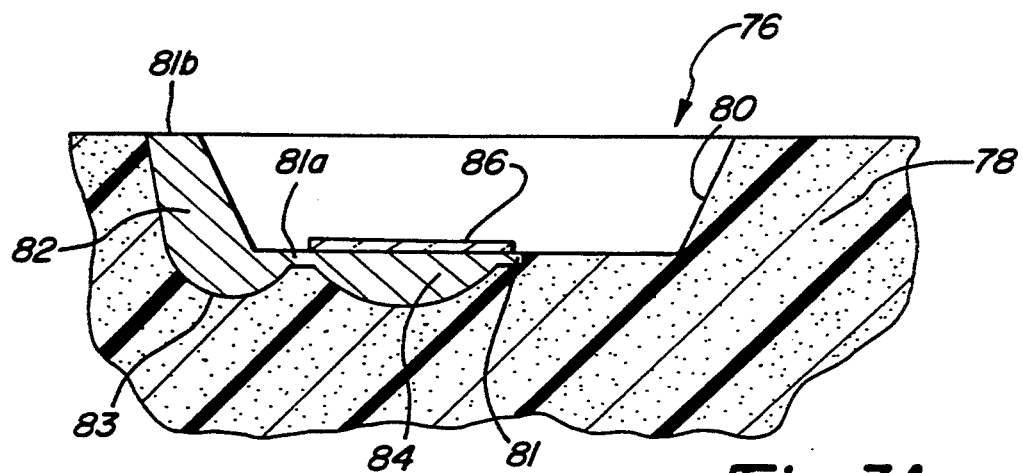
FIGS. 3A–3C are sectional views showing successive processing steps of a semiconductor microvalve structure according to a third preferred embodiment of the present invention.
Figure 3B:
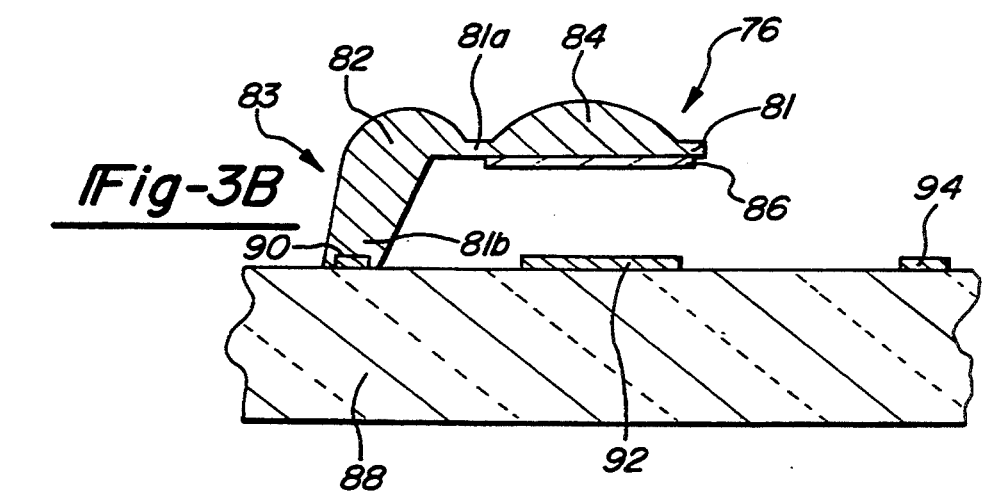
Figure 3C:
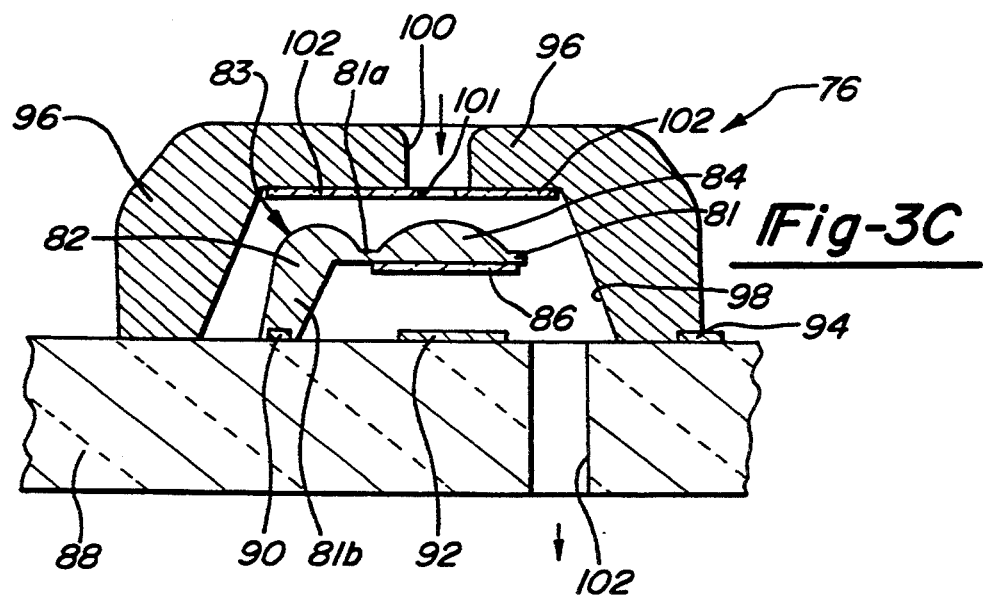

FIGS. 3A–3C show a microvalve structure 76 according to a third preferred embodiment of the invention. In FIG. 3A, a monocrystalline silicon substrate 78 is provided that is similar to the monocrystalline silicon substrate provided in the preceding embodiments of the invention. Further, as in the preceding embodiments of the invention, a recess 80 is defined by an appropriate etching process. Next, the entire upper surface of silicon substrate 78 is masked, and a window opened in the mask. The window corresponds to the lateral periphery of area 81, which can be seen to partially lie inside and outside recess 80. The portion 81b that extends up onto the major surface of substrate 78 will end up being the support portion of a resultant cantilevered beam 83. Accordingly, it has an area of sufficient size to give adequate support strength to the resultant cantilevered beam. Regions 81, 82 and 84 will comprise cantilevered beam 83.

Boron is diffused through the last-mentioned window to form a relatively shallow P++ diffusion area 81, as shown. During diffusion of the area 81, silicon oxide is reformed over area 81. Smaller diffusion windows (not shown) respectively located above the centers of the more deeply diffused areas 82 and 84 are opened in the reformed silicon oxide area. Boron is diffused through the smaller diffusion windows (not shown), to form the two more deeply diffused P++ areas 82 and 84 in region 81. Deep diffusion through relatively small diffusion windows forms the rounded, or generally hemispherical, configuration on the outer periphery of regions 82 and 84. The reasons for the rounded configuration on area 84 will hereinafter become more apparent.

Area 82 provides a thicker region to support the beam 83. Areas 82 and 84 are spaced apart, effective to leave a thin region 81a of region 81 separating them. Region 81a will become the area where the resultant cantilevered beam 83 flexes. Next, a blanket dielectric layer is deposited on substrate 78 and patterned to leave a dielectric patch 86 on the floor recess 80 that is generally coextensive with the lateral periphery of hemispherical area 84 of region 81. This will provide an insulative layer on the resultant cantilevered beam that will be discussed in greater detail below.

Turning to FIG. 3B, the silicon substrate 78, as shown in FIG. 3A, has been flipped over, and electrostatically bonded to a glass substrate 88. Just as with the embodiments shown in FIGS. 1 and 2, the glass substrate 88 has a thermal expansion property similar to that of silicon. Also, just as with the embodiments hereinbefore described, this structure is immersed in an EDP etching bath to remove the original silicon portion of the substrate 78 which was not doped with boron in the above described diffusion process. Consequently, all that remains of the monocrystalline silicon substrate 78 on glass substrate 88 is the cantilevered beam 83 and the dielectric layer 86. As in the preceding embodiments of this invention, prior to the silicon substrate 78 being electrostatically bonded to the glass substrate 88, the glass substrate 88 was metalized and patterned to form electrodes 90, 92 and 94. It can be seen that before bonding the silicon substrate 78 was positioned so that surface portion 81b of part 82 of the cantilevered beam would be disposed on electrode 90 as well as the glass plate and the suspended portion 84 is disposed over electrode 92. Electrode 94 is present to make contact with a covering monocrystalline silicon housing formed in the manner previously described.

Turning now to FIG. 3C, the microvalve structure 76 is shown in its final form. Specifically, a heavily doped P++ silicon shell 96 has been formed from a monocrystalline silicon wafer as previously described. The shell 96 was a P++ part of a monocrystalline silicon body (not shown) that was electrostatically bonded to glass substrate 88 as described above. However, unlike as described above, recess 80 in shell 96 does not contain any layers forming the cantilevered electrode. The reason, of course, is that the cantilevered electrode is a separate element previously affixed to the glass plate 88. P++ shell 96 was previously a P++ diffused region in a silicon substrate that has been selectively etched away after it was affixed to the surface of glass plate 88. Only the P++ diffusion region 96 of that monocrystalline silicon substrate remains. A gas inlet opening 100 has been formed in the shell 96 in the same manner as discussed in connection with the openings 38 and 50 of the previously discussed embodiments of this invention. A dielectric layer 102 surrounds gas inlet opening and has an aperture 101. Aperture 101 exposes gas inlet opening 100 to the recess 98. It can be seen that the outer periphery of dielectric layer 102 is generally larger than portion 84 of cantilevered beam 81. Orifice 101 is a substantially circular orifice having a diameter that is slightly smaller than but concentric with circular opening 100 in silicon housing 96. It is important that the diameter of orifice 101 be smaller than opening 100 to prevent any direct contact between beam portion 84 and housing 96 that would form an electrical short. Although not previously mentioned, it should be recognized that electrostatic attraction between housing 96 and beam 84 requires the presence of an insulating layer between them, to maintain them respectively oppositely charged.

Dielectric layer 102 was formed within recess 98 by deposition and patterning processes analogous to those hereinbefore described.

It should also be mentioned that passageway 102 in glass plate 88 is formed by various techniques. For example, passageway 102 can be formed by chemical etching, mechanical drilling, grit blasting or the like. Depending on how it is formed, it may be preferred to form the opening 102 in glass plate 88 before forming electrodes 90, 92 and 94 on it. In any event, passageway 102 provides an outlet opening to the recess 98.

It should be understood that, while not shown in the drawings, an appropriate broad area connection can be made to the top surface of the glass plate to provide access to inlet opening of the valve of this invention. Analogously, a broad area contact can be made to the backside of the glass plate to provide easy access to the outlet side of the valve of this invention. The nature of these connections do not form any part of this invention. They can be made in any convenient manner.

In operation, gas is introduced into the microvalve 76 via the gas inlet opening 100 and orifice 101. As previously indicated, the focus of this invention is to not only provide a valve that has means for electrostatically closing it, but also to provide a valve having electrostatic means for opening the valve and maintaining it open. The valves of this invention are intended to be activated in only two positions, which are fully open or substantially closed. In this connection, it should be recognized that when an opposite potential is applied to electrodes 90 and 92, opposite electrical charges will form on cantilevered beam 81 and electrode 92. This will snap the valve open if it is closed, and will maintain the valve open during use such that gas flow will not vary with time due to undesired fluttering or accidental or incidental mechanical vibration of the valve. On the other hand, as will hereinafter be explained further, this invention permits a predetermined, cyclic opening and closing, i.e., flutters of the valve in accordance with any selected open/close duty cycle. Since the valve is positively maintained open or closed, there is no unwanted random closing of the valve that will interrupt or reduce flow in a non-intended manner. Accordingly, regulation of the gas flow through the valve and flow through any additional flow passages is more accurate and/or as predetermined. It is this consistency that provides an additional advantage that is available with our microvalve over prior microvalves. Our valve can even permit use of this controller to determine mass gas flow. It may be desired to provide an additional dielectric coating on electrode 92 and/or to substitute that additional electrical coating for the dielectric coating 86 on cantilevered beam 81.

When it is desirable to close this particular valve, application of the D.C. voltage between electrodes 90 and 92 is discontinued and D.C. voltage is applied between electrodes 90 and 94. This latter action results in oppositely charging cantilevered beam 83 and heavily doped silicon shell 96. This causes cantilevered beam 83 to be attracted to silicon shell 96, thus closing the gas inlet orifice 101. As hereinbefore indicated, the dielectric layer 102 prevents electrical contact between the cantilevered beam 83 and the silicon shell 96.

As previously indicated, the hemispherical portion 84 of cantilevered beam 83 forms a hemispherical boss on the surface of the cantilevered beam. Boss 84 can be used to reduce the gap between the shell 96 and the cantilevered beam 83 such that less voltage is required to close the orifice 101. It also provides less surface area for contact with shell 96 around orifice 101, which reduces a possibility of the valve sticking in a closed position, and refusing to open when a normal valve opening voltage is applied. More will hereinafter be said about valve sticking, and on how to prevent it.

It is to be noted that in this embodiment of the invention, beam 83 and body 96 come from two different silicon substrates. As seen in FIG. 1D and FIG. 2, the earlier embodiments of the invention only used one silicon substrate. While the FIG. 3A–3B embodiment may appear a bit more complicated, it actually provides some significant unexpected advantages. For example, cantilevered beam 83 was originally made by forming a relatively shallow recess 80 in a first silicon substrate. Body 96 was formed by initially etching a substantially larger and deeper recess 98 in the second silicon substrate in order to diffuse into that substrate a P++ region that eventually became body 96. Accordingly, a first etching process can be optimized for formation of the most desirable beam configuration. A second etching process can be optimized to provide the best recess depth to cooperate in forming the cantilevered beam. It should also be recognized that the shallower etching process may prove to be satisfactory if also used on the second silicon substrate to form elongated restricted gas flow passages. However, those passages can be formed by the same etching process that forms recess 98 in the overlying silicon body 96.

Figure 4:
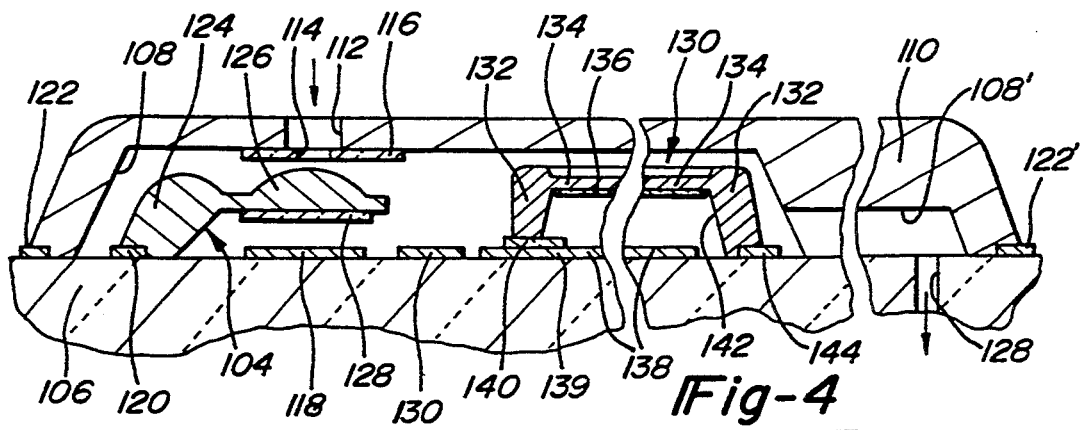
FIG. 4 is a sectional view showing an empirical microcontroller made in accordance with the valve of FIG. 3.

Reference is now made to FIG. 4 that empirically shows how two silicon wafers can be used to make a microflow controller on a glass plate. As can be seen on the left of FIG. 4, a valve assembly is formed of a P++ monocrystalline silicon cantilevered beam 104 that is affixed to a glass plate 106 of the same thermal expansion coefficient as that of silicon. The cantilevered beam 104 is disposed within a recess 108 of an overlying P++ monocrystalline silicon housing body 110. Housing body 110 has an opening 112 connecting with orifice 114 in a dielectric layer 116. An electrode 118 is disposed beneath the free end of cantilevered beam 104. Cantilevered beam 104 is in contact with electrode 120 on glass plate 106. The overlying silicon housing member in this embodiment of the invention is so large, that it may be desirable to make multiple electrical contacts to it. It is for this reason, a second electrical contact 122' is shown on the right side of the figure. Cantilevered beam 104 is an enlarged root portion 124 which is affixed to the surface of glass plate 106 in contact with electrode 120. The free end 126 of cantilevered beam 104 has a dielectric coating 128 on its surface. Dielectric coating 128 covers substantially the entire lower surface of the free end portion 126 of the cantilevered beam 104, and prevents direct contact, i.e., electrical shorting, between the cantilevered beam free end 126 and its underlying electrode 118. As in the preceding examples of the invention, when a potential difference is applied between electrodes 120 and 118, free end 126 of the cantilever beam is attracted towards electrode 118. When a potential difference is applied between electrode 122 and electrode 120, the body 110 and cantilevered beam 104 are oppositely charged and free end 126 of the cantilevered beam is attracted to the overlying portion of the body 110, closing orifice 114.

As indicated above, this embodiment of the invention contains a valve assembly, a temperature sensor, a pressure sensor and a restricted flow path 108' for gases that can be used to control the rate of flow of gases through recess 108 and out of an aperture 128 in the glass plate 106. Such a device can function as a mass flow microsensor. The temperature sensor can be a thermistor 130 printed on the surface of glass plate 106. However, the temperature sensor need not be a thermistor. It could be a capacitor or an active semiconductor device intimately associated with the gas flow, possibly even upstream of opening 112. If upstream, the temperature sensor could even be a diode or transistor that is part of an integrated circuit chip sensing gas flow temperature.

FIG. 4 also shows a pressure sensor 130 included in the microflow controller body 110. Pressure sensor 130 is essentially an annulus that comprises an annular thick P++ silicon ring portion 132 that circumferentially supports a continuous circular diaphragm 134. Diaphragm 134 is also of P++ silicon and is an integral extension of P++ rim 132. The underside of diaphragm 134 is coated with a dielectric 136, which can be seen, of the same composition as dielectric 128 on the underside of the free end portion 126 of the cantilevered beam 104. Coatings 136 and 128 can be of chemical vapor deposition (CVD) deposited silicon nitride, preferably with a thin sublayer of thermally formed silicon dioxide separating it from its supporting silicon surface. FIG. 4 is broken in its view through the middle of pressure sensor 130, to illustrate that pressure sensor 130 is a relatively large area device in this integrated assembly.

Pressure sensor 130 is essentially formed in the manner previously described for fabrication for cantilevered beam 104 shown at the left in this FIG. 4. This method of fabrication is also along the lines of the method disclosed in U.S. Pat. No. 4,815,472, Wise et al., a patent previously issued to one of the coinventors of this patent application. Pressure sensor 130 can be formed in the same silicon body from which cantilevered beam 104 was formed or from a separate silicon body. If it is of the same body as used to form cantilevered beam 104, recess 142 could be formed first, and then P++ diaphragm 134 diffused into the floor of the recess. Afterwards, the floor of the recess would be masked, leaving sidewalls of the recess open. P++ sidewall, i.e., thick rim portions, 132 could be diffused at the same time as the thicker portions 124 and 126 are diffused while forming cantilevered beam 104. In the alternative, pressure sensor 130 can be formed as described in U.S. Pat. No. 4,815,472, Wise et al., which forms the thick P++ regions first and then forms the thin diaphragm region 134. In either event, however, the resultant silicon body having the P++ diffused regions would be electrostatically bonded to the surface of glass plate 106 in the manner previously described and then the non-P++ portions of the silicon wafer etched away by a selected etchant, such as EDP.

Sensor 130 is a capacitor type sensor, with diaphragm 134 serving as one plate of the capacitor. Diaphragm 134 is in low resistance electrical communication with P++ rim 132, which is in turn in low resistance electrical contact with electrode 144. A complementary electrode for diaphragm 134 is electrode 138 that is disposed within recess 142 under diaphragm 134. Electrode 138 occupies most of the surface of the glass plate 106 exposed within recess 144 and has a very narrow portion extending out of the recess under the rim portion into recess 108. It can be seen that the narrow stem portion 139 of electrode 138 is covered with an insulating coating 140 of silicon dioxide, silicon nitride or the like to prevent a short circuit between rim portion 132 and the stem portion 139 of electrode 138. It should be mentioned that in order to maintain the greatest difference in capacitance between diaphragm 134 and electrode 138 when diaphragm 134 flexes, stem portion 139 should be as narrow as possible, because this narrow portion will exhibit a fixed capacitance with rim 132.

In this invention, the recess 142 of pressure sensor 130 has been sealed to the surface of glass plate 106 in a predetermined pressure environment, as for example, one atmosphere at 25° C. Any change in the pressure within the recess 108 from one atmosphere will cause diaphragm 104 to bow, thereby changing the capacitance between diaphragm 134 and electrode 138. Such a pressure sensor is an absolute pressure sensor.

If one would prefer to have a differential pressure sensor, an aperture through glass plate should be provided within recess 142 to the ambient pressure. In such event, diaphragm 134 will flex if the pressure in chamber 108 is different from ambient pressure. If capacitor sensor 130 is an absolute pressure sensor, thermistor 130 can be used to determine what the offset should be in pressure within recess 142 for changes in temperature.

When the free end 126 of the cantilevered beam 104 no longer closes orifice 114, gas is free to enter the recess 108. When the valve formed by cantilevered beam 104 is open, the pressure sensor 130 can provide a measure of the pressure within the chamber or recess 108. As previously indicated, at the right side of FIG. 4, there is shown a constricted flow path 108' that permits exit of gases from chamber 108 through a port 128 in glass plate 106. The flow path is an extended length flow path which can provide a predetermined flow rate of gases out of recess 108 at a predetermined temperature and pressure. The part of the figure on the right side of the drawing is broken in the area of constricted flow path 108' to indicate that it is a flow path of considerable length. The width and height of flow path 108' can be of any dimension, usually small, to provide the most effective microflow control. As previously indicated, flow path 108' could alternatively be etched into the face of glass plate 106. if higher flow rates are desired, etching channels in the glass plate should be considered. They can be made deeper than in the silicon. Registered mating channels in both provide even greater flow rates.

Figure 7:
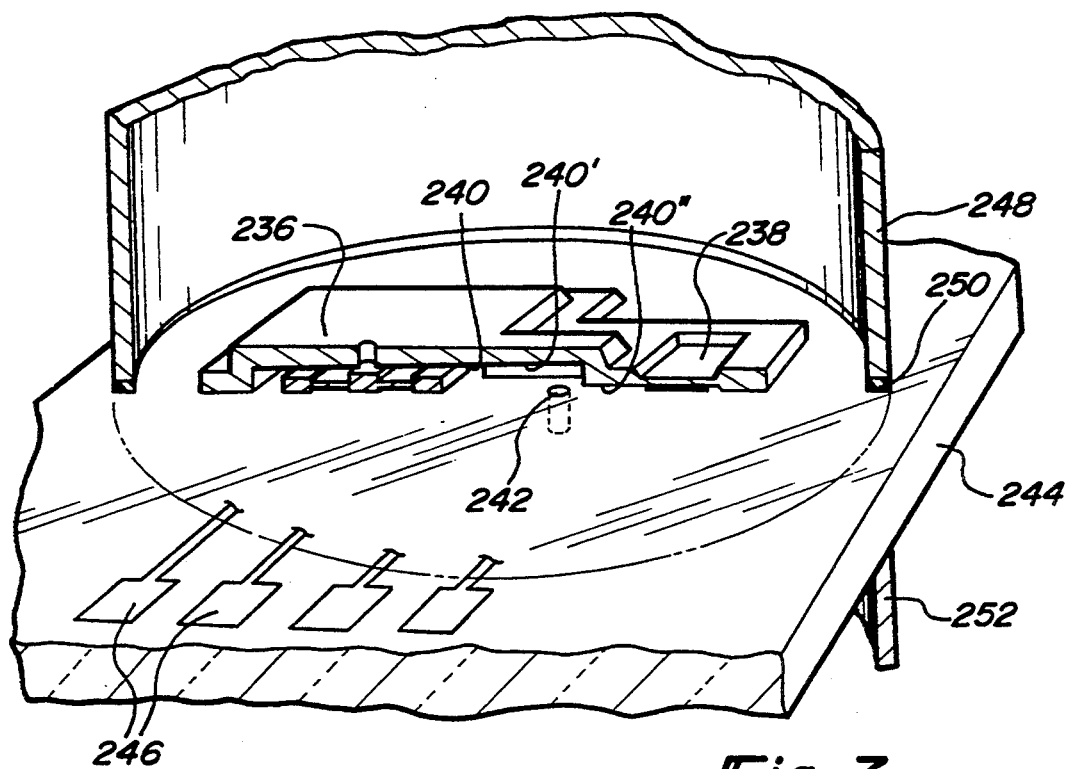
FIG. 7 shows a schematic view of a microcontroller assembly prior to encapsulation in a housing.
Figure 10:
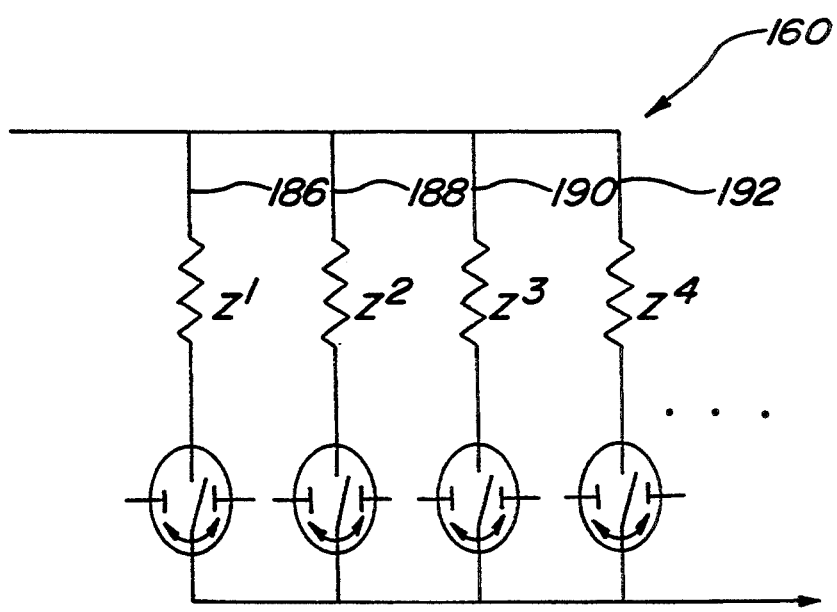
FIG. 10 shows a fluid flow schematic view of the four active microvalves of FIG. 9A downstream from respective restrictive gas flow channels.

The microflow controller shown in FIG. 4 is presented as a simple form of microcontroller made in accordance with this invention. It aids in pointing out some of the initial advantages of embodiments of these invention hereinbefore described. It should be understood, however, that in an actual microcontroller, still additional inventive features might be used, alone or in combination with those hereinbefore described. For example, the boss 126 on valve 104 of FIG. 4 provides a more rigid beam region that makes limited contact with insulator layer 116 surrounding orifice 114. The advantages of a boss on the beam for contact with the orifice can also be incorporated into a double ended clamped beam, as shown in FIGS. 5A–5E, 7, 9A and 9B. Also, the pressure sensor can be a differential pressure sensor, integrated into the housing, rather than the separate element absolute pressure sensor shown in FIG. 4. The cover-integrated differential pressure is shown in FIG. 7. Also, FIGS. 5A–5E show the incorporation of surface features on the beam and the housing that prevent the valve from sticking open or closed. More will be said about the possibility of such sticking, and of ways to avoid it. Still further, in an actual microcontroller, a plurality of valve/flow path combinations would be used in parallel, with respective flow paths preferably configured to differ binaurally in flow rates, as illustrated in FIG. 10.

Figure 5A:
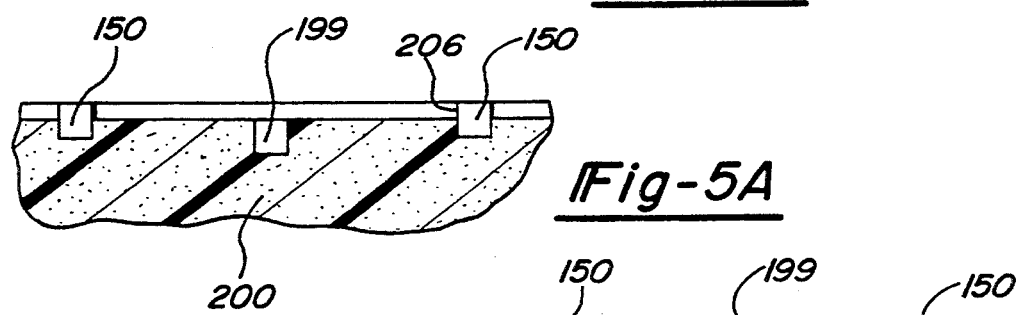
FIGS. 5A–5E are fragmentary sectional views showing successive process steps used in making still another valve configuration but using a process analogous to the valve of FIGS. 3A–3C.
Figure 5B:
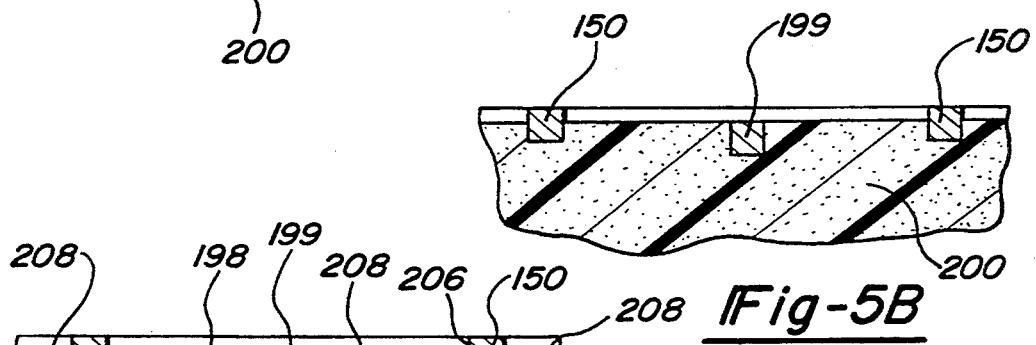
Figure 5C:
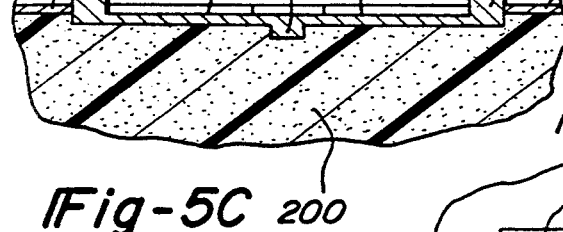
Figure 5D:
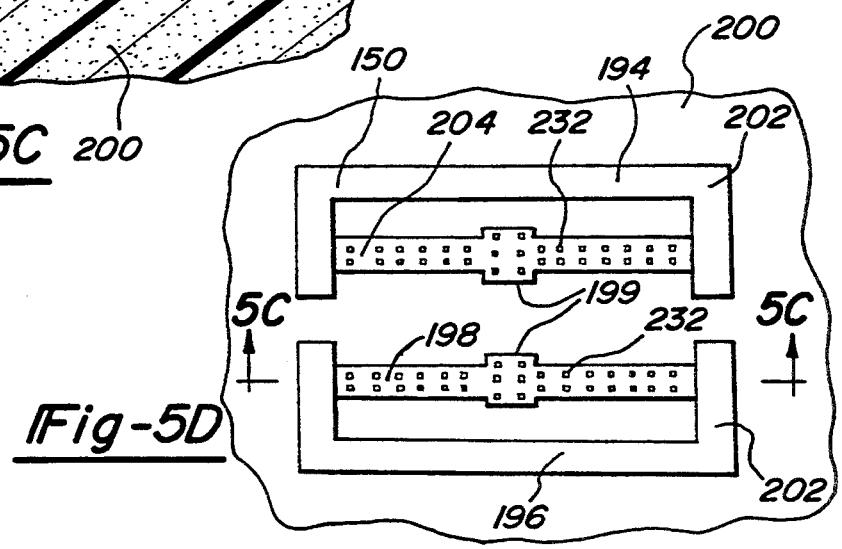
Figure 5E:
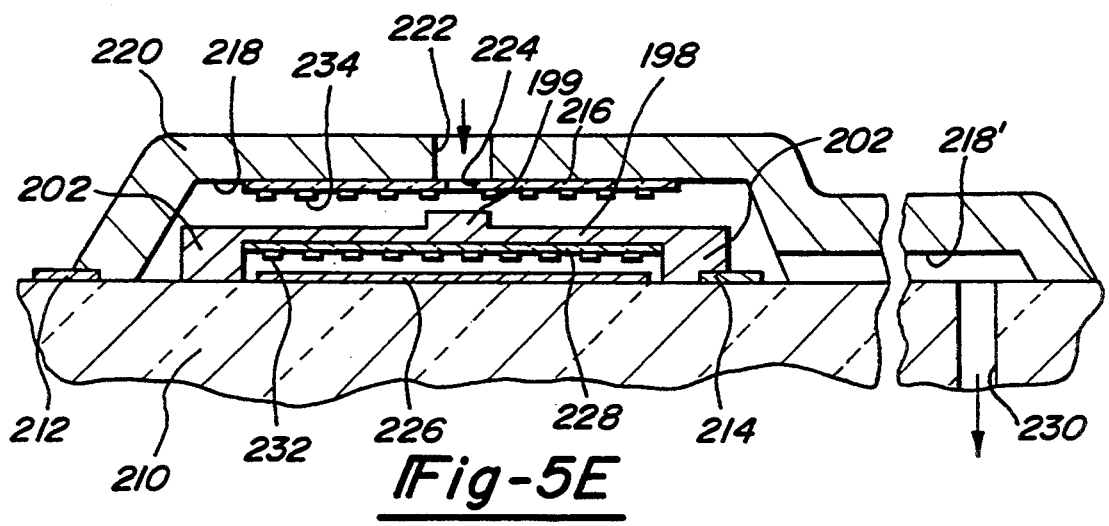

A double ended clamped beam having an integral boss is shown in FIG. 5E. It is formed by a process that is shown in FIGS. 5A–5D and that is analogous to the process used to make the cantilevered beam 104 in FIG. 4. Accordingly, the recitation of specific process details will not be unnecessarily repeated. The process of FIGS. 5A–5D is a double diffusion process combined with an etch process. In that sense, it is analogous to the process by which a pressure sensing diaphragm is formed in a patent to one of the co-inventors named herein, which patent is U.S. Pat. No. 4,815,472, Wise et al. However, the configuration of the product formed here is decidedly different. To start the process, a moderate to high resistivity monocrystalline silicon wafer is selectively etched to a depth of about 3 micrometers, as shown in FIG. 5A. The selective etch defines a raised surface configuration, surrounded by recessed surface portion 206, in a pattern of beam supports, or rims. The pattern of the beam supports or rims is as shown for the facing C-shaped beam portions 194/202 and 196/202 in FIG. 5D. The depth of this etch is variable and will eventfully determine the height of the beam above the supporting glass plate. Hence, the depth of etch is also related to the height of the valve chamber in which the beam is to be disposed, and vice versa.

Then, a high concentration of boron is selectively diffused about 12 micrometers into the raised portions of the etched surface, to form the diffused P++ regions 194/202 and 196/202 of FIG. 5D. Concurrently, boron is selectively diffused into two square central areas 199, respectively partially surrounded by the C-shaped diffusions 194/202 and 196/202. These square central areas will eventually each form a boss 199 in the middle of each resultant clamped beam shown in FIG. 5D. To perform the diffusion, the surface of the silicon wafer 200 is blanket oxidized and appropriate windows opened in the blanket oxide coating (not shown) corresponding to the configuration of the areas where diffusion is desired.

A heavy dose of boron is then diffused through the mask windows into the exposed surface of the silicon wafer 200, forming thick rim like P++ regions 194/202 and 196/202 on silicon wafer 200. The exposed surface of silicon wafer 200 is then masked with a thin layer 208 of silicon dioxide. A window is then opened in the silicon coating 208 that at least corresponds to each of the cantilevered beams 198 and 204 of FIG. 5D. However, it may be preferred to have the windows also expose the previously diffused regions 194/202, 196/202 and 199, to make sure there is a diffusion overlap of the resultant beams onto their supports. In any event, a heavy dose of boron is then diffused through the oxide windows for a relatively short period of time, to form the thinner P++ regions 198 and 204. In plan view, the resultant configuration is as shown in FIG. 5D. Generally, the initially diffused portions 194/202, 196/202 and 199 have a thickness of 6 micrometers. The width of regions 194/202 and 196/202 are about 100–200 micrometers. Portion 199 of each beam is about 200 micrometers square. The thin cantilever beam section 198 is generally about 2–3 micrometers thick. In FIGS. 5A–5E, the difference in thickness and width of the cantilevered beams 198 and 204 and sections 202 is not to scale for illustrative purposes.

Once the P++ regions 194/202 and 196/202 and their associated beam regions 198 and 204 have been formed in the silicon wafer, the silicon wafer is aligned with electrodes 212, 214 and 226 of the metallization pattern on glass plate 210, and electrostatically bonded to glass plate 210. As in the preceding discussion involving formation of the cantilevered beam 104 in FIG. 4, the silicon wafer is etched in EDP after bonding to the glass. The EDP selectively etches away all the silicon wafer, except for those portions that were doped to P++ conductivity. This leaves the resultant structure of a metallized glass plate having facing thick C-shaped rims 194/202 and 196/202, which respectively support cantilevered beams 198 and 204. Beam 204 is obscured by cantilevered beam 198 in FIG. 5E.

A second moderate to high resistivity monocrystalline silicon wafer is then chemically machined using process steps along the lines hereinbefore described for the first water. For example, the silicon wafer can be initially selectively etched in two steps to form a relatively deep recess 218 of about 12 micrometers, and a connected shallower recess 218'. The depth of shallower recess 218' can be of 4–8 micrometers and of a length to provide a given flow rate at a selected pressure. A relatively deep and high concentration boron diffusion is then selectively performed on the etched surface of the wafer, to form P++ region 220. Region 220 will eventually form housing body portion 220 in FIG. 5E. A diffusion depth of about 12 micrometers can be used. Boron is not diffused into the part of the second wafer that is to eventually to form opening 222 in body 220. A dielectric coating 216 of thermally formed or deposited silicon oxide or the like is disposed on the surface of recess 218 surrounding opening 222. Dielectric coating 216 is formed and photolithographically delineated before member 220 is released from the second wafer in which it is formed. Layer 216 provides an insulated orifice 224 for opening 222 in member 220. Insulating layer or coating 216 prevents a short circuit between body 220 and beam 198. A similar opening and insulating coating is provided around a second opening for the second cantilevered beam 204, which is not visible, in the sectional view shown in FIG. 5E. The second wafer is properly aligned on glass plate 210 and then electrostatically bonded to it, to form a closed chamber in combination with recesses 218 and 218'. The second wafer is aligned on the glass plate 210 so that the resultant body 220 is properly positioned over electrode 212, recess 218 is positioned over the beams and beam supports, and recess 218' is positioned over aperture 230 in the glass plate. After the bonding, the moderate to high resistivity original portions of the second wafer are selectively etched away, releasing the P++ region 220 as body or housing member 220.

In the resultant assembly, electrode 214 contacts thick region 202 that supports cantilevered beam 198. Since regions 196/202 and 198 are interconnected P++ silicon regions, region 198 is in low resistance electrical contact with electrode 214. Analogously, regions 194/202 and 204 are interconnected P++ regions. Contact of region 194/202 with a separate electrode (not shown), places beam 204 in low electrical resistance contact with the latter electrode. A third electrode 226 is disposed on the glass plate 210, in spaced relationship beneath the double ended clamped beam 198. In addition, a dielectric coating 228 covers the lower surface of beam 198. Dielectric coating 228 can be of thermally formed or CVD deposited silicon dioxide, or of silicon nitride, formed and photographically delineated along the lines used to form layer 216 around orifice 222 of housing 220. Alternatively, or in addition, electrode 226 can be covered with an insulating coating after it is formed and before bonding of the silicon wafers. The insulating coatings 216 and 228 prevent short circuiting to the beam 198.

In operation, when a voltage is applied between electrode 212 and electrode 214, beam 198 is attracted to body 220 and closes orifice 224. If the potential difference between electrodes 212 and 214 is terminated, and a voltage established between electrodes 212 and 226, beam 198 becomes attracted to electrode 226. This pulls the beam away from orifice 224, holding the subject valve assembly wide open. In this instance, gases can flow through inlet 22 through the valve assembly into recess 218. From recess 218, the gases flow into the extended tortious passage 218' to outlet port 230 in glass plate 210.

In the discussion of FIG. 5, details 232 on the lower portion of beam 198 and details 234, on the lower face of cover dielectric layer 216, were not addressed. The reason for this is that surface features 232 and 234 may not be necessary in a given beam configuration. On the other hand, it has been found that when a beam is attracted to either the housing 220 or to the glass plate 210, it might have a tendency to stay attached to one of those surfaces, even though the attracting voltage has been discontinued and the usual counteracting voltage applied to the opposite electrode. This attachment or sticking of the boss 199 and/or portions of the balance of the beam is aggravated if the EDP was not meticulously rinsed from within the cavity 218. It appears that a pyrocatechol can precipitate within the cavity 218 both above and below cantilevered beams 198 and 204. In such instance if the beam contacts the crystals, and there is sufficient beam crystal contact area, the beam will stick to the crystals. It appears that because of the flexibility of the beams outside of the thickened boss regions 199, the sticking problem can be greater outside of the boss area 199. Even if the pyrocatechol crystals are not present, there is still some tendency for the beam to adhere to the attracting surface above or below it. For example, sticking can also occur if a liquid is left in cavity 218. It appears that the thinner portions of the beam adjacent the boss 199 can flex into contact with surfaces above or below the beam under an electrostatic attractive force. Various mechanisms can cause sticking, once the surfaces are in contact.

Figure 6A:
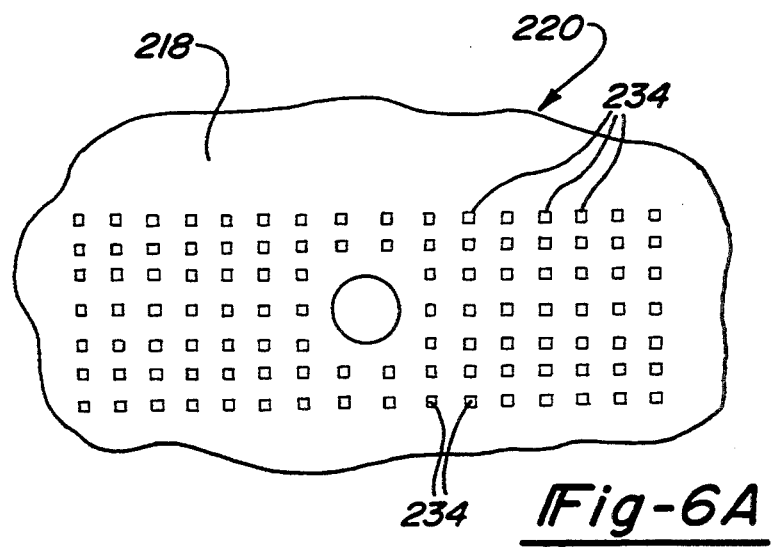
FIGS. 6A and 6B show enlarged fragmentary views of valve portions shown in FIG. 5E.

If sticking of the beam to the attracting surface is a problem, we recommend that one of the interfacial surfaces be coated with small bumps of metal or dielectric, to provide a reduced surface area of contact between the beam and the attracting surface. As shown in FIG. 5E, the dielectric coating 216 has plurality of such bumps 234 on its lower surface, facing the upper surface of beam 198. The pattern of these bumps is as shown in FIG. 6A. Because of the proximity of the beam to the dielectric coating 216, and because of the considerable flexibility of the beam outside of boss portion 199, a rather high density of such bumps is employed. We prefer to use bumps that are four micrometers square and about 1200 angstroms high, on centers of about 50 micrometers, on the lower surface of dielectric coding 216. We refer to such bumps as projections or feet. However, they are in actuality parallelapipeds.

The bumps, or projections, on the bottom of the beams are shown in FIG. 5B. They are indicated by reference numerals 232 on beam 198 and 232' on beam 204. The bumps on beam 198 can also be seen in FIG. 5E. Bumps 232 and 232' are preferably four microns square and about 35,000 angstroms high. They are spaced apart on centers of about 70 micrometers. Spacing is such that at maximum voltage, which usually is around 40–70 volts, the beam will not deflect enough between adjacent projections to touch the surface to which it is being attracted. The bumps above the beam should be small in height to reduce leakage when the valve is in the closed position. It is recognized that the presence of these bumps will not allow the valve to become completely closed. However, it becomes substantially closed, and that is enough. More will be explained about this later in this disclosure. The bottom feet, or projections, can be quite tall, or have a relatively large height, because there is no leakage path to be concerned with between them and lower electrode 226.

Figure 6B:
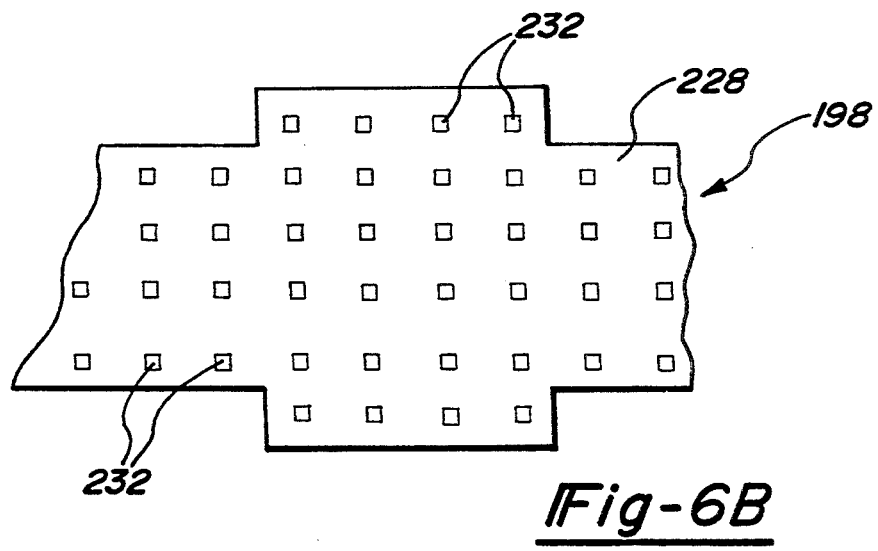

The bump, or projection, spacing, shape and distribution can vary widely. The form used on the underside of dielectric layer 218 is shown in FIG. 6A. The form used on the underside of beam 198 is shown in FIG. 6B. Fundamentally the dimensions of the bumps and the spacing of the bumps is highly variable. Their principal function is to provide a small contact area with the surface to which they come in contact. Fundamentally it is desired to make them as small as possible but of a size that is comfortable from a photolithographic processing standpoint. Analogously the composition of the bumps is not especially critical. It is believed that they can be made of substantially any metal and/or a dielectric such as silicon oxide and/or silicon nitride. Typical metallization metals may be appropriate as, for example, aluminum, gold, titanium etc.

It should also be mentioned that the contact bumps can be formed after processing of the silicon wafers from which beam 202 and body 220 are formed and before those wafers are bonded to glass plate 210. They are formed by depositing an additional blanket layer of the intended bump material onto cavity 218 over dielectric layer 216, or onto the recess within which dielectric layer 228 is disposed. After the blanket metallization, the blanket layer can be photolithographically etched to define the selected shape and spacing of the individual bumps or feet. Bump height is the thickness of the blanket layer that was deposited.

In addition, it is recognized that it may be possible to simply roughen the exposed surfaces of the layers 216 and 228 after they are formed, which roughening would inherently provide a fine distribution of contact bumps that inherently and integrally reduces planar contact area on that surface. The surface roughening can be accomplished by etching. For example one might use reactive ion etching under conditions where sputtering activity is more active than chemical etching.

As hereinbefore indicated, it is recognized that a differential pressure sensor can be made by the techniques hereinbefore described and that a differential pressure sensor can be incorporated in the housing member over the beam in the valve assembly, such as the housing 220 in FIG. 5. This necessitates a more complex etching of the wafer from which the housing is formed both in periphery and thickness. Such a product is shown in FIG. 7 where the valve housing is indicated by reference numeral 236 and the pressure sensing diaphragm is indicated by reference numeral 238. Housing 236 has a valve chamber 240 with a connected restricted flow passage 240' that extends to an aperture 242 in the supporting metallized glass plate 244. It can be seen that a narrow extension 240" communicates the area of restricted flow passage 240' near hole 242 with the underside of the pressure sensing diaphragm 238. Glass plate 244 is a metallized glass plate having all the appropriate electrodes needed to microcontroller elements under the housing 236. This includes external contact areas 246. Housing 236 is a chip that is generally less than about one centimeter square, glass substrate 244 is slightly larger than housing 236. It is large enough to accommodate the end of a stainless steel tube 248 that is bonded by silicon adhesive 250 and external contact areas 246. The axis of tube 248 is perpendicular to the face of plate 244. Its flat end is bonded to the flat face of glass plate 244 and forms an encircling chamber around microcontroller 236. However, stainless steel tube 248 does not cover the contact ends 246 of the metallization pattern on the face of glass plate 244. A second stainless tube 252 is analogously bonded to the underside of glass plate 244, surrounding hole 242. Suitable connections can be made to the upper end of stainless steel tube 248 and to the lower end of stainless steel tube 252 to form suitable inlet and outlet connections to the resultant assembly.

Figure 8:
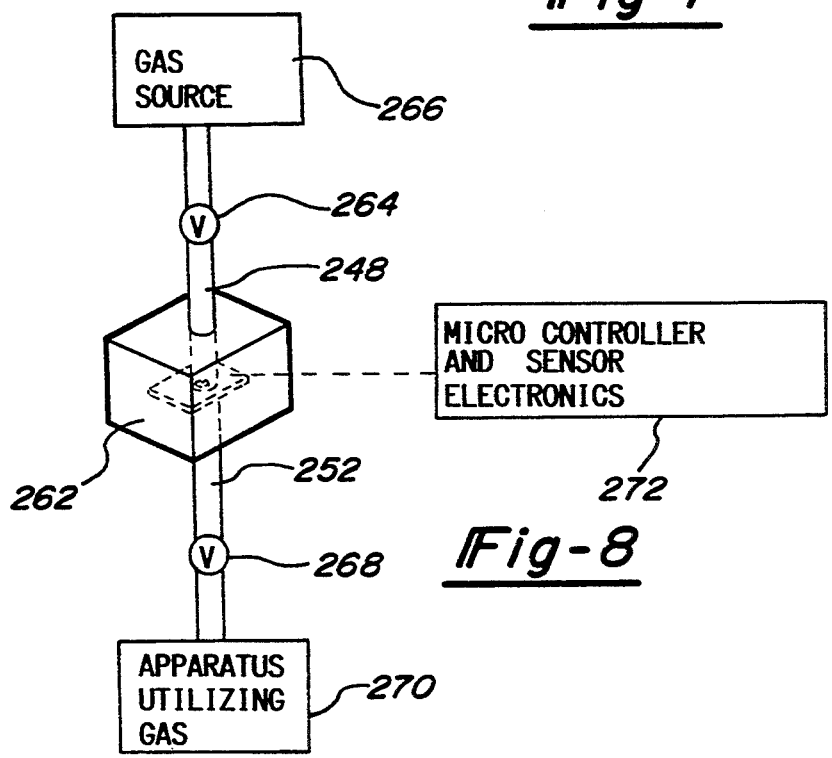
FIG. 8 shows a diagrammatic view of a microcontroller system of this application.

The device shown in FIG. 7 would be normally encapsulated in some convenient housing. The housing is indicated by reference numeral 262 in FIG. 8. As indicated in FIG. 8, inlet tube 248 would be connected through an open/close valve 264 to a gas source 266. Analogously, stainless steel tube 252 would be connected through an open/close valve 268 to the apparatus 270 that would be utilizing the controlled gas flow through the microcontroller. The various contacts 246 of the microcontroller would be connected to microcontroller and sensor electronics 272. As previously indicated in connection with FIG. 5E, the surface conformations 234 on insulator layer 216 will prevent boss 199 from completely sealing orifice 224 when it is in the closed position. The valve will have a minor leak. A minor leak rate, however, is not intolerable, especially if one uses the microcontroller in a system such as shown in FIG. 8 where complete shutoff valves can be located upstream and/or downstream of the microcontroller, as are valves 264 and 268 in FIG. 8. On the other hand, since the microvalve will have a minor leak rate when it is in the closed position, this will have to be accommodated, and recognized, when one calibrates the microcontroller. A microcontroller such as shown in FIGS. 9A and 9B has various combinations of valves that be open and/or closed. However, once calibrated the fact that any given valve has a minor leak rate is not detrimental, it merely somewhat narrows the range in flow rates that are available from that microcontroller. Since most microcontrollers will have a multiplicity of valves with each valve being associated with a significantly different flow rate passage, minor leaks in any given valve are accommodated during microcontroller calibration.

In addition, when a boss is used on a double ended clamped beam, the nature of the seal made with the orifice is improved anyway, consequently a reduction in this improvement still yields a net gain in sealing effectiveness. Moreover, there is a net gain in reliability of valve operation, which might be the most important of all.

FIGS. 9A and 9B show an illustration of an actual microcontroller made in accordance with these inventions. The controller of FIGS. 9A and 9B includes dual valves per flow path. The redundancy is used in case one valve fails in the closed position. The microcontroller of FIGS. 9A and 9B also includes a separate flow path for each redundant pair of valves. Further, the flow paths differ from one another in binary exponential fashion, as indicated in FIG. 10.

More specifically, FIG. 9A shows a plan view of a microflow controller 146, with external housing, inlet and outlet pipes removed, looking through a metallized glass plate 148. As indicated in the preceding embodiments of this invention, the glass plate 148 has a patterned metallization on its under-surface that makes contact to a plurality of P+ silicon rims 150 disposed on the glass under-surface. The rims 150 support thin integral P++ silicon beams 152. Enlarged portions of the beams cover apertures (not shown) in a relatively large, i.e., 1 cm × 1 cm, monocrystalline silicon covering body analogous to body 110 in FIG. 4.

Rim portions 150 and beam portions 152 are respectively analogous to the cantilevered beam support portion 124 and suspended portion 126 shown in FIG. 4. The structures have been more specifically described, and their methods of formation more specifically described, in the description of FIGS. 5A–5E.

FIG. 9A shows rim 150 and beam 152 integral structures, each of which is a clamped double ended beam type of structure illustrated in FIGS. 5A–5E. The structures 156, 158, 160 and 162 in the outermost corners of FIG. 9A are test valve structures. The underlying monocrystalline silicon plate 154 does not cover them. On the other hand, the underlying monocrystalline silicon plate 154 does cover the structures 164, 168, 170 and 172. A recess 174 is etched into the face of the underlying silicon plate 154 contacting the lower face of glass plate 148 for each of the valve systems 164, 168, 170 and 172. Each of the recesses 174 is connected to outlet port 176 in the overlying glass plate 148. Each recess 174 is connected to outlet 176 by means of a set of parallel grooves indicated by reference numeral 178 for valve assembly 164, 180 for valve assembly 168, 182 for valve assembly 170 and 184 for valve assembly 172. Each set of parallel grooves is analogous to the restricted flow path more schematically illustrated by reference numeral 108' on the right of FIG. 4 and to the right of FIG. 5E.

As previously indicated, the flow path restrictions 178, 180, 182 and 184 are not all the same. Instead, they are set up in binary fashion akin to the schematic illustrated in FIG. 10, where the respective flow paths 186, 188, 190 and 192 differ exponentially. FIG. 10 differs from FIGS. 9A and 9B, however, in that the flow restrictors are upstream from the valves 194 instead of downstream.

Pressure sensors 173 and 175 are present in this structure. They can be made along the lines described in connection with FIG. 4 but preferably FIG. 7. Pressure sensor 175 senses outlet port pressure. Pressure sensor 173 helps measure pressure drop across valve 168.

It can be seen that, within a given range, by proper selection of flow path combinations, a wide variety of flow rates can be very precisely produced. It should also be noted that in each of the valve assemblies 164, 170 and 172, the cantilevered beam units are redundant. This offers assurance that at least one will work. In addition, it is possible that if both work, the opening of only one aids in providing still further control of gas flow.

It can be seen that in valve 164 the gas inlet opening is at the very end of the free ends of the cantilevered beams 162. It is conceivable that there can be lateral movement of the cantilevered beams that will not allow proper seating over the inlet gas openings (not shown) in the underlying silicon plate 154. This can provide a possibility that the valve would predictably close if there was lateral displacement of the cantilevered beam with respect to the gas inlet opening (not shown). Greater stability to the cantilevered beam is obtained in the double ended clamped beam structure shown in valve assembly 172. Since both ends of the cantilevered beam are secured by the thick rim portion 150, there is less likely to be lateral displacement of the beam and more reliability of closure of its underlying gas inlet opening (not shown).

It should also be recognized that the thinner the beam and the longer its length, the more effective the electrostatic force can be in assuring positive closure of the associated gas inlet orifice. However, as hereinbefore indicated, extreme flexibility of the beam may lead to sticking of the beam closed or even open. Hence, undue length and flexibility is not necessarily desirable. A proper balance should be used in which the flexibility is high enough to allow a lower open/close voltage to be used, i.e., certainly less than 100 volts. However, flexibility should not be so low as to allow applicable parts of the beam to flex into contact with the attracting surface at points removed from the aperture to be closed. In valve assembly 170 (in the lower right corner of FIG. 9A), the beam is a clamped double ended beam. However, it is not a straight beam, but is a sinuous, or back and forth, configuration that provides an undulated extended length within a given distance between the center of the beam and its clamped end. It can be seen in valve 170 that one sinuous structure takes up the space of two straight double ended clamped beams. Accordingly, only one beam and inlet port area is present in valve 170 in the lower right of FIG. 9A. Valve assembly 168 in the upper right of FIG. 9A is analogous to valve assembly 170 in that it only has one inlet port (not shown) underneath the center portion of a double ended clamped beam 152. In this case, there are two portions of the clamp beam, but they both terminate in the same center port. The double ended clamped beam in valve assembly 168 can also be described as two interdigitated spirals that intersect at their centers. The double ended clamped beam structure provides greater stability and likelihood that the center of the beam will orient itself over the gas inlet opening (not shown) in the underlying silicon body 154 and give positive closure of that opening when electrostatic field is applied between 154 and the two halves 152 of the single cantilevered beam in this valve assembly. As previously indicated, the valve assemblies 152, 164, 168, 170 and 172 were made by a technique as illustrated in FIGS. 5A–5E. As with the beam of FIGS. 5A–5E, if sticking of any of these beams is a problem, the surface of the beam and/or the attracting surface can be coated with bumps, such as 232 and 234 in FIGS. 5D, 5E, 6A and 6B, or roughened to form integral bumps.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, different packaging and processing may be employed. Also, different valve configurations and interconnections may be developed based upon the teachings provided herein. Accordingly, it is to be understood that the protection sought and to be afforded hereby should be deemed to extend to the subject matter defined by the appended claims, including all fair equivalents thereof.

We claim:

1. A micromachined valve apparatus comprising:
   a valve unit substrate;
   a micromachined electrically conductive housing having a coefficient of expansion at least generally matching that of said substrate;
   one of said substrate and said housing having a recess therein;
   a bond between facing surfaces of said housing and said substrate that encircles said recess and forms a substantially closed chamber between said substrate and said housing;
   an opening in one of said housing and said substrate providing access to said chamber;
   a micromachined electrically conductive beam element disposed wholly within said chamber, said beam element having a fixed portion and a suspended portion;
   said fixed portion secured to one of said substrate and said housing within said chamber and said suspended portion movable into a position in said chamber such that the suspended portion can contact and substantially close said opening in said chamber; and
   electrostatic means for moving said suspended beam portion with respect to said opening, effective to change closure disposition of said suspended portion with respect to said opening.

2. The micromachined valve apparatus of claim 1 wherein the bond between said facing surfaces of the housing and said substrate is continuous, and the electrostatic means includes first electrostatic means for moving said suspended beam portion towards said opening for restricting flow therethrough, and second electrostatic means for moving said suspended beam portion away from said opening for unrestricting flow therethrough.

3. A micromachined valve system comprising:
   a valve unit substrate having at least an insulating and flat surface portion and a selected metallization pattern thereon;
   a micromachined electrically conductive housing having a recess portion, said recess portion of said housing having a periphery hermetically bonded to said flat and insulating surface portion, forming a substantially closed chamber with said substrate over a portion of said metallization pattern;
   first and second openings to said chamber for gas flow through said chamber, one said openings including an orifice on a wall of said chamber;
   a micromachined electrically conductive beam supported within said housing, wherein said beam is supported at one end by a relatively thick bonded portion of said second member and is free to move at the other end, wherein movement of said free end in one direction substantially closes said recess orifice, and movement of said free end in an opposite direction substantially opens said orifice, for controlling gas flow through said housing;
   means for maintaining said suspended beam electrically insulated from said orifice and said housing, even when said suspended beam portion is moved into gas flow inhibiting disposition at said orifice;

means for applying a first electrical potential between said housing and said suspended beam, effective to electrostatically move said suspended beam portion into gas flow inhibiting disposition at said orifice; and means for discontinuing said electrical potential between said housing and said suspended beam, and for applying a second electrical potential between said beam and an electrode disposed within said chamber adjacent said suspended beam but opposite from said orifice;

means for maintaining said beam electrically insulated from said electrode; and means for maintaining said second electrical potential between said beam and said electrode, so long as gas flow is desired through said orifice.

4. The micromachined valve assembly as described in claim 3 wherein said chamber orifice is a periphery of a chamber opening, and said suspended other end of said beam has a substantially rigid integral projection thereon for closure cooperation with said recess orifice, which projection requires other parts of the suspended other end to bend before making contact with chamber portions surrounding the recess orifice.

5. The micromachined valve assembly as described in claim 4 wherein said projection has a substantially flat surface for closing said recess orifice.

6. The micromachined valve assembly as described in claim 4 wherein said projection has a substantially hemispherical surface for closing said recess orifice.

7. A micromachined valve assembly having an electrostatically movable portion of a suspended beam as a gate element for closing an aperture to a housing, comprising:

a substrate having a substantially flat and insulating surface portion;

a relatively thick electrically conductive first member of monocrystalline semiconductor material, said member having a recess therein and an aperture in said recess;

a substantially flat periphery on said recess bonded to said substrate surface portion, whereby said recess forms a substantially closed chamber with said substrate;

a second member of electrically conductive monocrystalline semiconductor material disposed wholly within said chamber, said second member having at least one relatively thick support portion bonded to said substrate surface portion within said chamber and also having a suspended beam portion that is integral with said support portion and provides a closure member for said recess aperture;

electrodes on said substrate surface portion for oppositely electrically charging said first semiconductor member and said second member, effective to pull said beam closure member into closing engagement with said recess aperture.

8. The micromachined valve assembly as described in claim 7 wherein both ends of said suspended beam portion are integral to one or more of said support portions of said second member, and a central part of said suspended beam portion is movable into closure position with said recess aperture.

9. The micromachined valve assembly as described in claim 8 wherein said substrate is an electrically nonconductive glass plate, said glass plate has at least one additional electrode thereon, and said additional electrode is disposed under said suspended beam portion for pulling said suspended beam portion away from said recess aperture when a voltage is applied between said additional electrode and said suspended beam portion.

10. The micromachined valve assembly as described in claim 8 wherein said semiconductor material is silicon, said substrate is an electrically nonconductive glass plate, said glass plate has a thermal expansion coefficient generally matching that of monocrystalline silicon and has at least one additional electrode thereon, and said additional electrode has a beam actuation portion that is disposed between said suspended beam portion and said glass plate in position opposite from said recess aperture, effective to permit a voltage to be applied between said electrode and said second member that pulls said suspended beam portion away from said recess aperture.

11. The micromachined valve assembly as described in claim 8 wherein said suspended beam portion has a length that is generally parallel said flat substrate surface portion, the length has a center, and at least parts of said suspended beam portion are non-linear in a plane parallel to said flat substrate surface.

12. The micromachined valve assembly as described in claim 11 wherein said nonlinear parts have an undulated configuration in a plane parallel to said substrate surface portion.

13. The micromachined valve assembly as described in claim 11 wherein said nonlinear parts are non-linear in a plane parallel to said substrate surface portion and are symmetrical with respect to the center of said suspended beam portion length.

14. The micromachined valve assembly as described in claim 11 wherein the nonlinear parts form an interdigitated spiral.

15. The micromachined valve assembly as described in claim 8 wherein both of said first and second semiconductor members are primarily formed of silicon.

16. The micromachined valve assembly as described in claim 8 wherein both of said first and second semiconductor members are of silicon, and said relatively thick bonded support portion of said second member is generally C-shaped in the plane of the substrate.

17. The micromachined valve assembly as described in claim 8 wherein an additional electrode is disposed on said substrate insulating surface portion, said additional electrode being located under said suspended beam portion area and opposite from said recess aperture, said additional electrode has an extension on said substrate insulating surface portion leading away from said suspended beam portion area, the extension has a part that passes between facing end portions of said bonded thick support portion of said second member into an area of said chamber beside said second member, and the extension also has a part that passes outside said chamber through a channel between facing bonded portions of said substrate and said first member, whereby the extension provides means for external electrical connection to said additional electrode, and said channel is externally blocked to close said channel.

18. A method of controlling a micromachined valve comprising the steps of:

providing a micromachined suspended silicon beam on a glass plate within an electrically conductive silicon hollow housing electrostatically sealed to the glass plate, said plate having two electrodes thereon for applying a voltage between said beam and said housing that moves a portion of the beam into disposition that closes an aperture in said housing;

providing a third electrode within said housing, adjacent a surface of said suspended beam opposite from said aperture;

applying a voltage between said two electrodes to produce an electrostatic attraction between said housing and said beam that moves said beam portion into disposition that closes said aperture in said housing;

discontinuing application of said voltage between said two electrodes and applying a voltage between said third electrode and one of said two electrodes, effective to apply a voltage between said beam and said third electrode in a predetermined manner that moves said beam portion away from said aperture in a predetermined manner; and maintaining application of said last mentioned voltage substantially continuously, so long as gas flow through said aperture is desired.

19. A microflow controller comprising:
a microflow controller substrate;
a micromachined electrically conductive housing;
one of said housing and said substrate having a recess therein, said recess having a micromachined valve portion and an integrally connected restricted gas flow portion;
a bond between said substrate and said housing that closes said recess and forms a substantially closed chamber between said substrate and said housing, which chamber includes a valve portion and an integrally connected restricted gas flow portion;
a first opening in one of said substrate and said housing providing direct access to said valve portion of said chamber;
a second opening in one of said housing and said substrate providing direct access to said restricted gas flow portion of said chamber at a part thereof removed from said valve portion;
a micromachined electrically conductive beam supported within said housing, said beam having a suspended portion movable into disposition that substantially closes said first opening;
first electrostatic means for pulling said movable suspended beam portion to said opening, effective to block said opening; and
second electrostatic means for pulling said movable beam portion away from said opening housing, effective to maintain the opening unblocked.

20. The microflow controller as described in claim 19 in which said chamber also includes an integrated pressure sensing unit.

21. The microflow controller as described in claim 20 in which said chamber also includes an integrated temperature sensing unit, effective to provide a mass gas flow meter.

22. The microflow controller as described in claim 20 in which said microflow controller cooperates with associated control circuitry to comprise a mass gas flow meter.

23. A micromachined valve apparatus comprising:
a valve unit substrate;
a micromachined electrically conductive housing;
one of said substrate and housing having a recess therein;
a bond between said housing and said substrate that closes said recess and forms a substantially closed chamber between said substrate and said housing;
an opening in one of said housing and said substrate providing access to said chamber;
a micromachined electrically conductive beam supported within said housing, said beam having a suspended portion movable into disposition that contacts and substantially closes said opening;
a boss on the suspended portion of the beam that preferentially makes contact with the housing surrounding the opening in the housing recess, and spaces the balance of the suspended portion of the beam from contact with the housing unless extended flexing of the beam occurs; and
electrostatic means for attracting said movable beam portion to said opening, effective to substantially block said opening.

24. A micromachined valve apparatus comprising:
a valve unit substrate having a substantially flat and insulating surface portion having a metallization pattern thereon for cooperation with micromachined valve components;
a micromachined electrically conductive housing having a recess therein and a substantially planar edge surrounding said recess;
a continuous bond between said housing planar edge and said substrate portion that closes said recess and forms a substantially closed chamber between said housing and said substrate;
an aperture in one of said substrate and said housing providing access to said chamber;
a micromachined suspended electrically conductive beam supported within said housing, said suspended beam having a beam portion movable into a position where said beam portion contacts and substantially closes said aperture;
said beam portion including a projection arranged for interaction with said aperture and which spaces the balance of said movable portion of said suspended beam from contact with the member having the aperture except for extreme flexure of the beam; and
electrostatic means for moving said projection on said suspended beam portion to said aperture, effective to substantially close said aperture.

25. In a micromachined valve having an aperture member and a suspended beam that forms a movable aperture closure member, which movable aperture closure member is electrostatically actuated to or from said aperture member, the improvement which comprises projections on at least one of said suspended beam and a second surface the beam contacts when the beam is electrostatically actuated.

26. The micromachined valve of claim 25 in which the projections are of a patterned coating of a material selected from the group consisting of metal and dielectric.

27. In a micromachined valve having an aperture member, a substrate member, and a suspended beam that includes a movable portion for closure of an aperture in said aperture member, which movable aperture closure portion is electrostatically actuated to and away from said aperture member, the improvement which comprises projections on said aperture member to reduce the area of contact between contacting parts of said movable beam portion and said aperture member; and projections on at least one of said movable beam portion and said substrate member to reduce the area of contact between contacting parts of said movable beam portion and said substrate member; said projections being respectively effective when said movable beam portion is electrostatically actuated to or away from said aperture.

28. The micromachined valve of claim 27 in which the projections are of a patterned coating of a material selected from the group consisting of metal and dielectric, the coating is disposed on the aperture member surface facing the beam, the coating is also disposed on the beam surface facing the substrate, and no such coating is present on the beam surface facing the aperture or the substrate surface under the movable beam portion.

29. A micromachined valve apparatus comprising:
a valve unit substrate of an electrically nonconductive glass plate, said glass plate having a thermal expansion coefficient generally matching that of single-crystal silicon;
a micromachined electrically conductive housing of single crystal silicon;
one of said substrate and said housing having a recess therein;
a bond between facing surfaces of said housing and said substrate that encircles said recess and forms a substantially closed chamber between said substrate and said housing;
an opening in one of said housing and said substrate providing access to said chamber;
a micromachined electrically conductive beam supported on one of said substrate and said housing within said chamber, said beam having a movable suspended portion for contacting and substantially closing said opening;
first electrostatic means for moving said movable beam portion towards said opening, effective to substantially block said opening; and
second electrostatic means for moving said movable beam portion away from said opening, effective to unblock said opening; and
one of said electrostatic means includes an electrode on said glass substrate that has a beam actuation portion that is disposed between said suspended beam portion and said glass plate in line with said recess opening, effective to permit a voltage to be applied between said electrode and said second member that moves said suspended beam portion away from said recess opening.

* * * * *